(12) United States Patent
Younger et al.

(10) Patent No.: US 9,946,993 B2
(45) Date of Patent: Apr. 17, 2018

(54) HEURISTICALLY-DRIVEN PLATFORM AND METHOD FOR HIRING BASED ON PREVIOUSLY-SUPPORTED JOBS

(75) Inventors: John Younger, San Rafael, CA (US); Michael Howell, San Anselmo, CA (US)

(73) Assignee: HireMojo, Inc., San Francisco, CA (US)

( * ) Notice: Subject to any disclaimer, the term of this patent is extended or adjusted under 35 U.S.C. 154(b) by 1488 days.

(21) Appl. No.: 13/282,176

(22) Filed: Oct. 26, 2011

(65) Prior Publication Data

US 2012/0109838 A1 May 3, 2012

Related U.S. Application Data

(60) Provisional application No. 61/407,116, filed on Oct. 27, 2010, provisional application No. 61/473,037, filed on Apr. 7, 2011.

(51) Int. Cl.
*G06Q 10/00* (2012.01)
*G06Q 10/10* (2012.01)

(52) U.S. Cl.
CPC .................. *G06Q 10/1053* (2013.01)

(58) Field of Classification Search
USPC .................. 705/7.11–7.42, 300–348
See application file for complete search history.

(56) References Cited

U.S. PATENT DOCUMENTS

| | | | |
|---|---|---|---|
| 6,385,620 B1* | 5/2002 | Kurzius et al. | |
| 6,772,129 B2* | 8/2004 | Alvarez et al. | 705/14.41 |
| 7,155,400 B1* | 12/2006 | Jilk et al. | 705/7.14 |
| 7,650,286 B1* | 1/2010 | Obeid | 705/1.1 |
| 2002/0128894 A1* | 9/2002 | Farenden | 705/8 |
| 2003/0023511 A1* | 1/2003 | Gardner, Sr. | 705/27 |
| 2003/0037032 A1* | 2/2003 | Neece | G06Q 30/02 |
| 2004/0204983 A1* | 10/2004 | Shen et al. | 705/10 |
| 2005/0065835 A1* | 3/2005 | Younger | 705/9 |
| 2005/0216339 A1* | 9/2005 | Brazell et al. | 705/14 |

(Continued)

OTHER PUBLICATIONS

Jansen, Bernard J., Karen J. Jansen, and Amanda Spink. "Using the web to look for work: Implications for online job seeking and recruiting." Internet research 15.1 (2005): 49-66.*

*Primary Examiner* — Alan S Miller
(74) *Attorney, Agent, or Firm* — Perkins Coie LLP

(57) ABSTRACT

A heuristically-driven platform and method for hiring based on previously-supported jobs and collected metrics solves the problem of efficiently connecting hiring agents and suitable job candidates. A portal application includes an inventory of successful placements and successful listings, allowing hiring agents to build job searches against a database of historical jobs. Leveraging the portal's inventory of placements and listings, the hiring agent may build a listing and design a candidate search based on previous listings, search venues for the same job type and metrics collected against each. An embodiment may provide the hiring agent a listing of the hiring agent's jobs, a list of applicants for each listed job and the detail for each applicant. The platform monitors applicant flow, online interviews, and site usage analytics for each position, suggesting alternatives and course corrections to the hiring agent if the performance of the job search is sub-par based on benchmarks.

22 Claims, 18 Drawing Sheets

(56) References Cited

U.S. PATENT DOCUMENTS

| | | |
|---|---|---|
| 2006/0026069 A1* | 2/2006 | Mazurkiewicz et al. ....... 705/14 |
| 2006/0122875 A1 | 6/2006 | Kolbe |
| 2008/0114728 A1* | 5/2008 | Huck ................................ 707/3 |
| 2008/0249852 A1* | 10/2008 | Ting et al. ...................... 705/14 |
| 2008/0294616 A1* | 11/2008 | Schwalb ........... G06F 17/30542 |
| 2009/0006178 A1 | 1/2009 | Taylor et al. |
| 2009/0011395 A1* | 1/2009 | Schmidt et al. .............. 434/322 |
| 2009/0254413 A1 | 10/2009 | Chang et al. |
| 2010/0076986 A1* | 3/2010 | Obeid ........................... 707/750 |
| 2010/0114988 A1* | 5/2010 | Linn et al. .................... 707/805 |
| 2011/0276507 A1* | 11/2011 | O'Malley ............. G06Q 10/00 705/321 |

\* cited by examiner

1100

WE CAN HELP!

1. TELL OUR EXPERTS ABOUT YOUR HIRING NEEDS

MESSAGE: 1102

2. TELL US ABOUT THE JOB

1104 JOB TITLE:
1106 JOB LOCATION:
1108 CATEGORY: ▼
1110 SUPPORT LEVEL: ☐ ENTERPRISE FULL SUPPORT
☐ PLATFORMPLUS FULL SUPPORT
☐ UNSURE

1112 PREFERRED HIRING CONSULTANT:

1114 SUBMIT

| JOBS | SETTINGS | HOW WE WORK | |
|---|---|---|---|

CREATE NEW JOB | SEARCH JOBS [         ]  [ SEARCH ]

420 →

NEED HELP NOW?
[ GET STARTED ]

| TITLE | STATUS | LOCATION | LAUNCH DATE |
|---|---|---|---|
| XXXXXXXXXX | XX | XXXXXXXXXX | MM/DD/YY |

JOB ACTIVITY                    CANDIDATES      APPLIED
X CANDIDATES REVIEWES           PAST WEEK          X
X CANDIDATES RECCOMMENDED
X CANDIDATES NOT HIRED          PAST TWO WEEKS    X
X CANDIDATES INTERVIEWED
X CANDIDATES FROM THE           SINCE LAUNCH      X
  ACCOLO NETWORK

← 1408

XXXXXXXXXX    XX    XXXXXXXXXX    MM/DD/YY

JOB ACTIVITY                    CANDIDATES      APPLIED
X CANDIDATES REVIEWES           PAST WEEK          X
X CANDIDATES RECCOMMENDED
X CANDIDATES NOT HIRED          PAST TWO WEEKS    X
X CANDIDATES INTERVIEWED
X CANDIDATES FROM THE           SINCE LAUNCH      X
  ACCOLO NETWORK

Fig. 15

CANDIDATE DETAILS  1406

1602 — NAME: XXXXX
TITLE: XXXXX
PHONE: XXXXXX    EMAIL: XXXXXXXXX
JOB ID: XXX      JOB TITLE: XXX
SOURCE: XXX

SCORE: XX.XX — 1608

| MAKE DECISION ▼ | HOLD | TRANSFER | FORWARD PROFILE | NOTE | EMAIL | PRINT |

1610
1612

| ONLINE INTERVIEW | RESUME | NOTES | HISTORY |

SECONDARY INTERVIES QUESTIONS (SIQ)

1604 —
OPEN ENDED QUESTION 1  XXXXXXXXXXXXXXXXXXXXXXXXXXXXXXXXXXXXX
    RESPONSE TO QUESTION 1

OPEN ENDED QUESTION 2  XXXXXXXXXXXXXXXXXXXXXXXXXXXXXXXXXXXXX
    RESPONSE TO QUESTION 2

OPEN ENDED QUESTION 3  XXXXXXXXXXXXXXXXXXXXXXXXXXXXXXXXXXXXX
    RESPONSE TO QUESTION 3

INITIAL INTERVIEW QUESTIONS (IIQ)

1606 —
1. MULTIPLE CHOICE QUESTION 1              X POINTS
   OPTION 1
   OPTION 2
   OPTION 3

2. MULTIPLE CHOICE QUESTION 2              X POINTS
   OPTION 1
   OPTION 2
   OPTION 3

3. MULTIPLE CHOICE QUESTION 3              X POINTS
   OPTION 1
   OPTION 2
   OPTION 3

Fig. 16

HEURISTICALLY-DRIVEN PLATFORM AND METHOD FOR HIRING BASED ON PREVIOUSLY-SUPPORTED JOBS

CROSS REFERENCE TO RELATED APPLICATIONS

This application claims benefit of U.S. provisional application Ser. No. 61/407,116, filed Oct. 27, 2010 and U.S. provisional application Ser. No. 61/473,037, filed Apr. 19, 2011, both of which Applications are incorporated herein in their entireties by this reference thereto.

BACKGROUND

Field of the Invention

The invention relates to a self-service hiring platform. More particularly, the invention relates to a heuristically-driven platform and method for hiring based on previously-supported jobs.

Background Information

Finding the path of least resistance between the hiring agent and the candidate for a job is a challenge faced by almost any hiring agent at least once. Every growing company has a common problem: finding people fast enough to meet business objectives.

The Internet has quickly become an important medium for hiring agents and jobseekers alike, easily and effectively allowing broad dissemination of candidate and job and employment information. Job postings, traditionally made on local bulletin boards, paper periodicals, company newspapers, and help-wanted newspaper advertisements, appeared on Internet web pages. In addition to mere job postings, career portals sprang up. "Career portal" is a broad term, and includes various services. One example is an Internet web site that helps centralize a job search by providing links to many different job boards, career management sites, hiring corporations (internal recruiting department), recruiters, staffing companies, and other online resources. A different example of a career portal is an Internet web site of a recruiting agency. There are various other examples too, each being a different enhancement of the simple idea of an online job posting.

With the introduction of these online job postings, career portals, and the like, hiring companies and job seekers enjoyed immediate benefits since the job postings were easier to keep current. Indeed, postings could be continually updated, removed, or added. Also, with the immediacy of the Internet, online job postings became available worldwide to anyone with Internet access.

In spite of such advantage, existing options for finding and managing candidates are highly fragmented and time consuming to manage, often including web postings, advertisements, employee referrals, engaging recruiters, and searching resume bulletin boards.

A hiring agent, when he or she has a job to fill, may not even know where to start. The hiring agent may not be sure whether to use an external recruiter, an internal recruiting department, social media or a job board, or all of these. Moreover, finding the right candidate for the job is an important, even a crucial activity, yet the hiring agent may have great difficulty devoting the time and other resources to the task required.

Efforts have been made to decrease the randomness of the recruitment/hiring process by having a single, dedicated organization manage the process from beginning to end: narrowing the job search by having a well-drafted job description that attracts the right candidates, managing the interview process and so on. It has been found, however, that such a vertically-integrated hiring organization does not scale well, becoming increasingly unwieldy and costly to manage as it becomes larger.

Sitting on top of these problems is a fundamental difficulty in managing a hiring process to ensure that there is a reliable way to review whether a corporate entity's hiring strategy was accurately implemented, realistically adjusted based upon interim results, and met its corporate objectives.

A hiring campaign may go awry at the very beginning with the first publication of the job listing. Drafting a job listing and position description that generates a steady volume of responses from the right type of candidate requires skill and patience. Even a poor selection of job title can have a negative effect on a hiring campaign. Hiring agents often lack the skill or the time that this important task requires.

Today, there is also no realistic mechanism that supports the adjustment of a hiring strategy based upon interim results. The options are usually not well thought out, reviewed or based on previous jobs, so management decisions are made in a vacuum. They "just happen", leading to erratic results whose only certainty is that they cost money, take time and take resources, with no promise of a positive outcome. Additionally, it is difficult to coherently collect and review interim results with relevant decision-makers. The consequence of this is more sporadic activity and misdirection, often feeding on itself, ultimately costing far more than is reasonable.

SUMMARY

A heuristically-driven platform and method for hiring based on previously-supported jobs and collected metrics solves the problem of efficiently connecting hiring agents and suitable job candidates. A portal application includes an inventory of successful placements and successful listings, allowing hiring agents to build job searches against a database of historical jobs. Leveraging the portal's inventory of placements and listings, the hiring agent may build a listing and design a candidate search based on previous listings, search venues for the same job type and metrics collected against each. An embodiment may provide the hiring agent with a listing of the hiring agent's jobs, a list of applicants for each listed job and the detail for each applicant. The platform monitors applicant flow, online interviews, and site usage analytics for each position, suggesting alternatives and course corrections to the hiring agent if the performance of the job search is sub-par based on benchmarks.

BRIEF DESCRIPTION OF THE DRAWINGS

FIG. 11 provides a screenshot of an upgrade page from a heuristically-driven platform and method for hiring based on previously-supported successful jobs;

FIG. 15 provides a screenshot of a listing of a user's currently live jobs from a heuristically-driven platform and method for hiring based on previously-supported successful jobs;

FIG. 16 provides a screenshot of a candidate detail page from a heuristically-driven platform and method for hiring based on previously-supported successful jobs.

DETAILED DESCRIPTION

Figure 1:
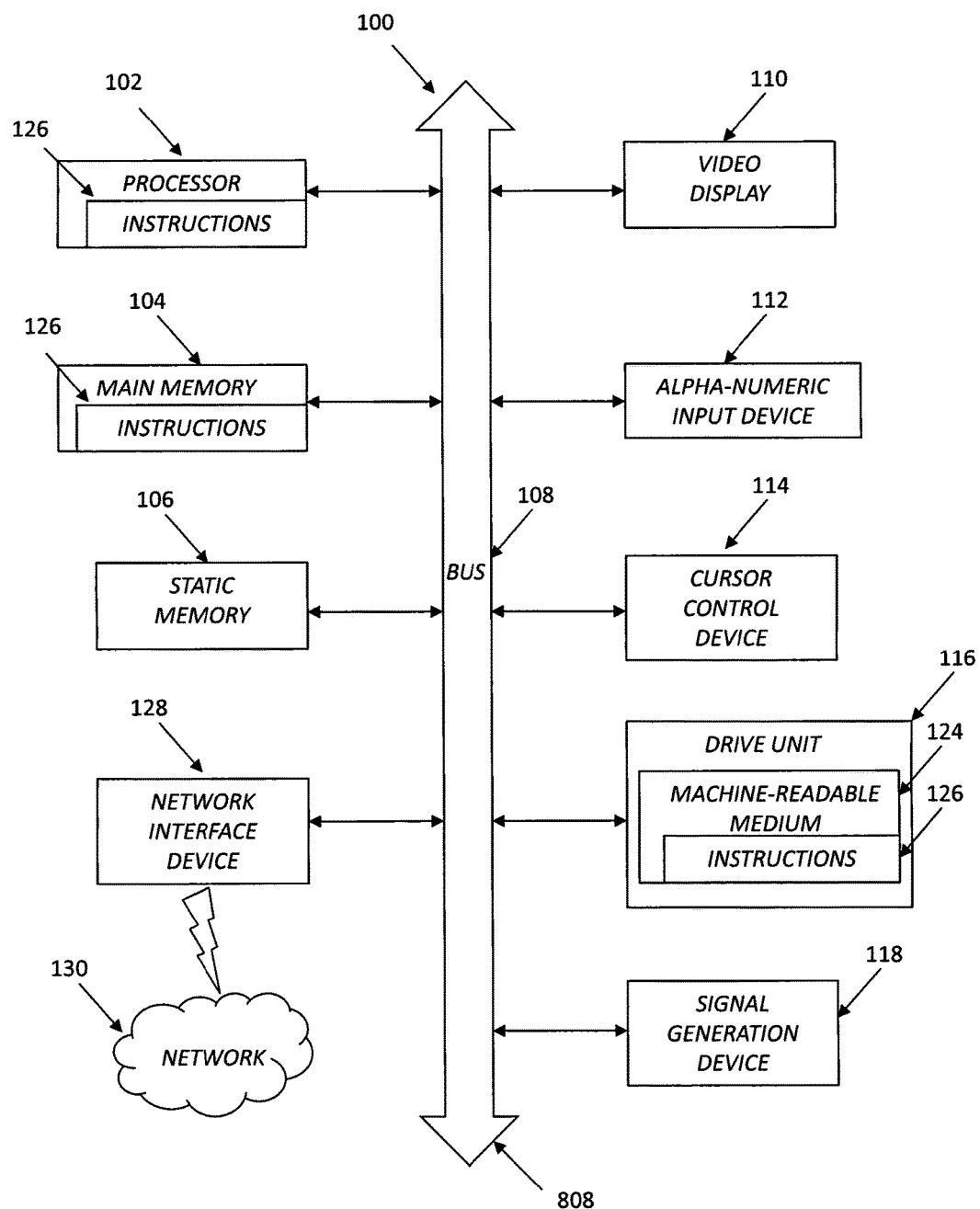
FIG. 1 provides a diagram of a machine in the exemplary form of a computer platform within which a set of instructions, for causing the machine to perform any one of the methodologies discussed herein below, may be executed.

A heuristically-driven platform and method for hiring based on previously-supported jobs and collected metrics solves the problem of efficiently connecting hiring agents and suitable job candidates. A portal application includes an inventory of successful placements and successful listings, allowing hiring agents to build job searches against a database of historical jobs. Leveraging the portal's inventory of placements and listings, the hiring agent may build a listing and design a candidate search based on previous listings, search venues for the same job type and metrics collected against each. An embodiment may provide the hiring agent a listing of the hiring agent's jobs, a list of applicants for each listed job and the detail for each applicant. The platform monitors applicant flow, online interviews, and site usage analytics for each position, suggesting alternatives and course corrections to the hiring agent if the performance of the job search is sub-par based on benchmarks. Referring now to FIG. 1, shown is a diagrammatic representation of a machine in the exemplary form of a computer platform 100 within which a set of instructions for causing the machine to perform any one of the methodologies discussed herein below may be executed. In alternative embodiments, the machine may comprise a network router, a network switch, a network bridge, personal digital assistant (PDA), a cellular telephone, a web appliance or any machine capable of executing a sequence of instructions that specify actions to be taken by that machine.

The computer platform 100 includes a processor 102, a main memory 104 and a static memory 106, which communicate with each other via a bus 108. The computer platform 100 may further include a display unit 110, for example, a liquid crystal display (LCD) or a cathode ray tube (CRT). The computer platform 100 also includes an alphanumeric input device 112, for example, a keyboard; a cursor control device 114, for example, a mouse; a disk drive unit 116, a signal generation device 118, for example, a speaker, and a network interface device 128.

The disk drive unit 116 includes a machine-readable medium 124 on which is stored a set of executable instructions, i.e. software, 126 embodying any one, or all, of the methodologies described herein below. The software 126 is also shown to reside, completely or at least partially, within the main memory 104 and/or within the processor 102. The software 126 may further be transmitted or received over a network 130 by means of a network interface device 128.

In contrast to the platform 100 discussed above, a different embodiment of the invention uses logic circuitry instead of computer-executed instructions to implement processing offers. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large scale integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments of this invention may be used as or to support software programs executed upon some form of processing core (such as the Central Processing Unit of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information. Additionally, a "machine-readable medium" may be understood to mean a "non-transitory" machine-readable medium.

Figure 2:
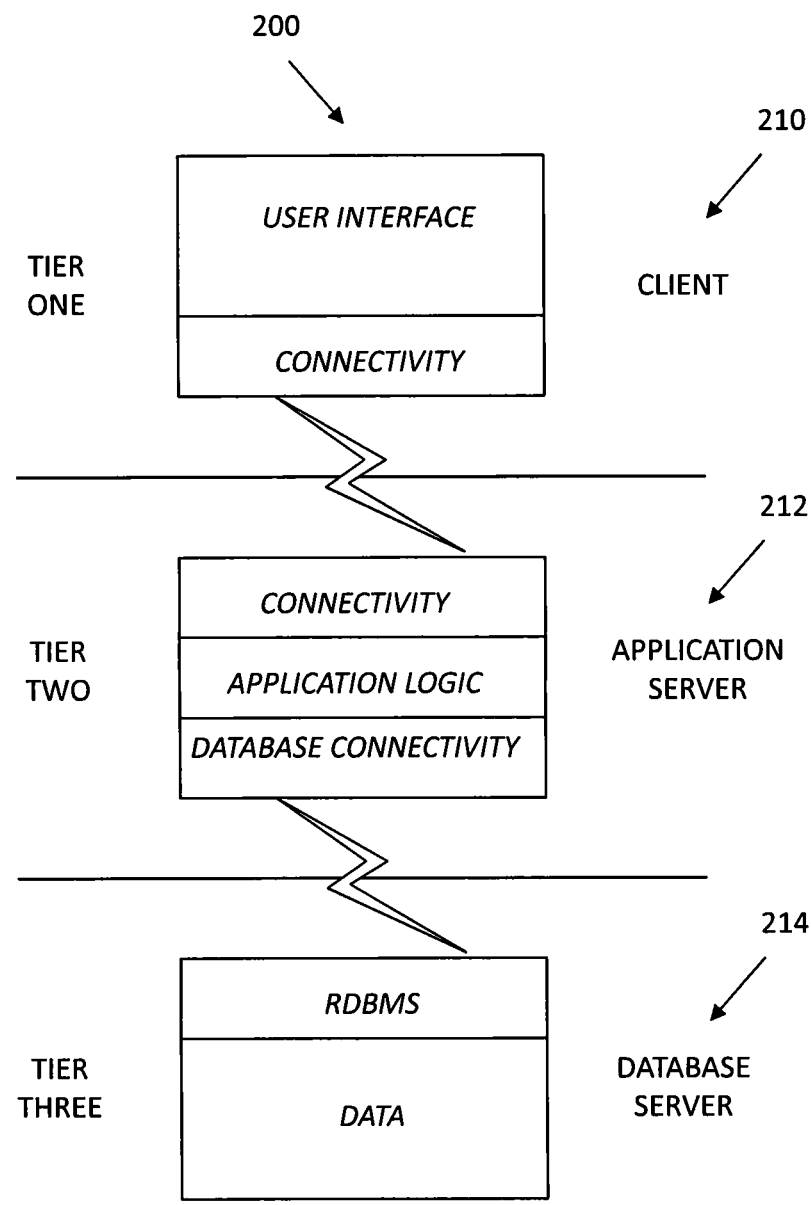
FIG. 2 provides a diagram of a client-server architecture for upon which a model for a platform for hiring based on previously-supported successful jobs may be implemented.

Referring now to FIG. 2, shown is a block diagram of a client-server architecture 200 over which at least one embodiment is implemented. In overview, the client-server architecture separates the various processes of an application into separate tiers, or layers. In an embodiment, each tier is housed separately from the other tiers on a separate device. In other embodiments, the tiers may be distributed across computing devices in other ways. In additional embodiments, the tiers may all be housed on a single computing device. As shown in FIG. 2, a client-server architecture may include a client 210, an Application server 212, and a database server 214. As shown in FIG. 2, the client 210 may house the presentation layer, or user interface (UI). In an embodiment, the UI may be made up of a number of pages that one can access with a browser-type application. By interacting with the presentation layer or UI, the user requests data from the database by entering input via various UI elements. Additionally, the user, via the UI, is able to input data upon which the application layer may act and which may also be saved to the database 214. Also, by means of the UI, the user views data returned by the platform in response to user request.

The application server may house the application logic, such as business rules and functional modules that actually process data. For example, in the presently described platform, the user enters his/her own search terms, such as keywords or a position title. Based on the user's input, the platform returns a list of successful job listings that are closely-related to the position the user seeks to fill. It is business logic housed within the application layer 212 which retrieves the successful job data from the database, and reports it to the user via the UI. Thus, the application layer provides most of the functionality specific to the present platform and method. The application layer, however, does not store persistent data. In an embodiment, the presentation layer and the application server may both reside on a single device.

Finally, the database server 214 may house a database management platform and a database for processing and storing persistent data. It is to be appreciated that the present platform and method are data-driven, relying, for example, on large numbers of successful job listings. Additionally, the described platform and method are constantly incorporating new data in the form of user input and are constantly generating new data in the form of newly successful job listings and associated data. It is the database layer 214 which stores all of this data and manages it by means of a suitable DBMS (database management platform).

In addition to the foregoing, the various tiers or layers also incorporate connectivity elements for communicating with the adjacent tiers or layers.

Figure 3:
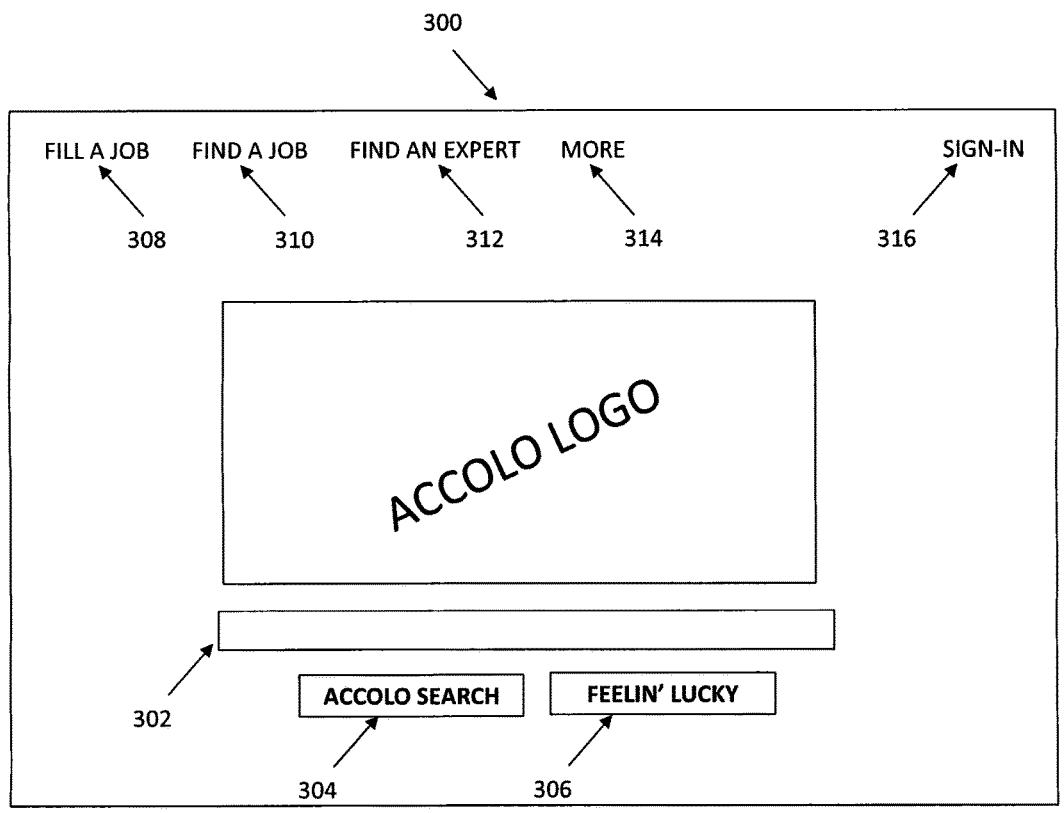
FIG. 3 provides a screenshot of a landing page from a heuristically-driven platform and method for hiring based on previously-supported successful jobs.

Referring now to FIG. 3, a landing page 300 from a heuristically-driven platform and method for hiring based on previously-supported jobs is shown. In an embodiment, the landing page 300 includes an interface element 302, into which a user may enter one or more search terms. In an embodiment, the one or more search terms may constitute one or more job or position titles or one or more key words related to a position the user is seeking to fill. In an embodiment, the page 300 also includes an interface element 304, such as a button, activation of which initiates a search of a database, described in greater detail herein below, of job listings which have measured for success based upon benchmark data.

In an embodiment, a 'Feelin' Lucky' interface element 306 allows a user to attempt to locate the most relevant successful job listing serendipitously, potentially saving the user a significant amount of search time. For example, in an embodiment, the search algorithm automatically returns a limited set of successful job listings that are determined to be particularly relevant to the user's query.

In an embodiment, the page may include a number of additional interface elements such as:
  'Fill a job' 308, which navigates the user to a page for creating a job listing;
  'Find a job' 310, which navigates a job-seeker to a page for searching open job listings;
  'Find an Expert' 312, which navigates a user to a page for selecting a placement expert to assist in a candidate search or a job search;
  'More' 314, which navigates the user to a menu of additional features and services; and
  'Sign-in' 316, which navigates a user to an authentication page, from which a registered user can sign in to his/her account on the platform.

In addition, the page 300 may contain one or more additional legends or captions or logos or graphical elements and so on which may constitute a service provider's trademarks and/or trade dress.

Figure 4:
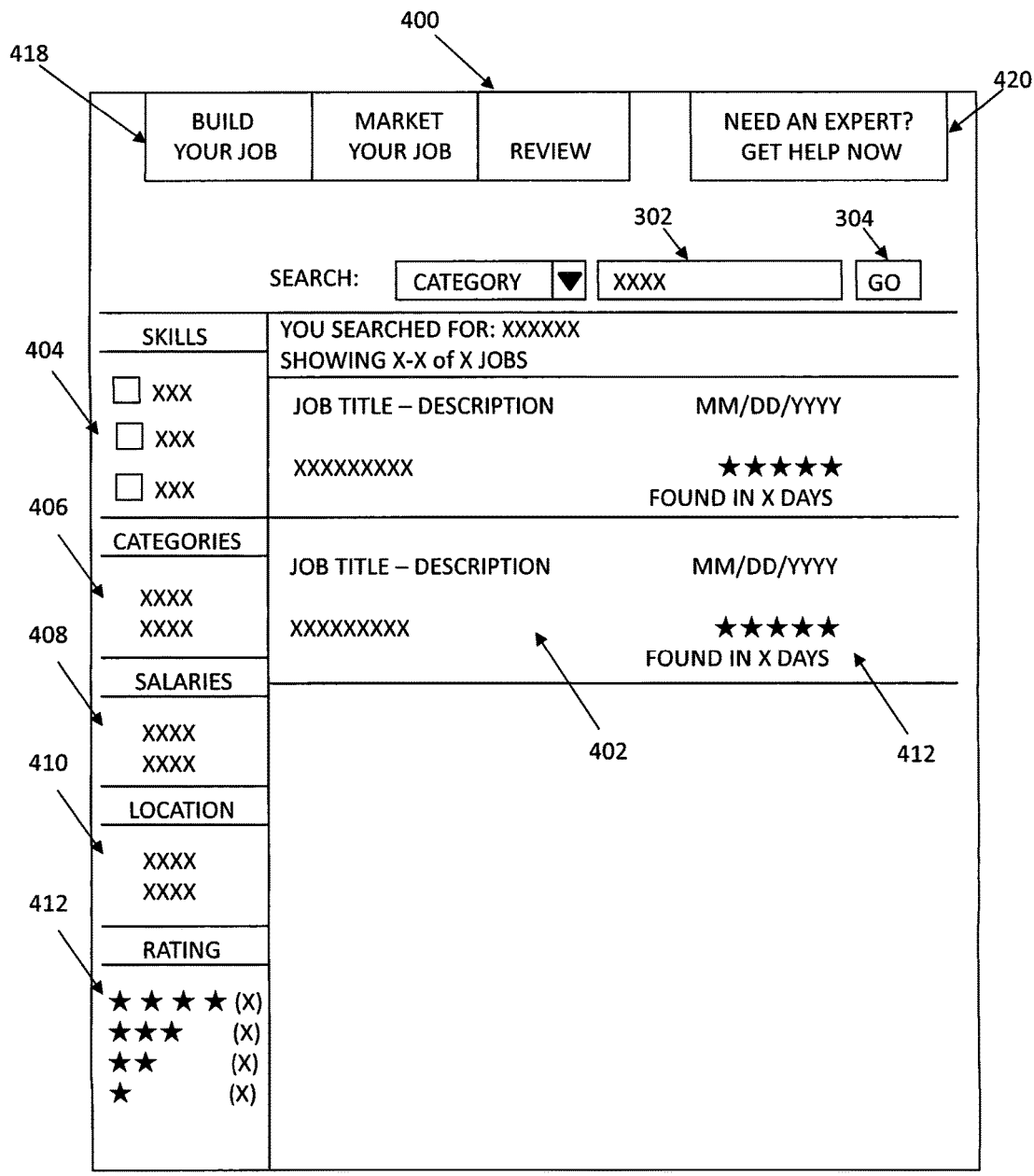
FIG. 4 provides a screenshot of a job search page from a heuristically-driven platform and method for hiring based on previously-supported successful jobs.

Turning now to FIG. 4, a screenshot is shown of a job search page 400 from a heuristically-driven platform and method for hiring based on previously-supported jobs.

In some embodiments, pages 300 and 400 may share some of the same functionality. In some embodiments, the platform may include one or both of pages 300 and 400. Similar to page 300, embodiments of page 400 may include a data-entry field 302 and 'search' button 304, serving the same functions in page 400 as they do in page 300. Additionally, in certain embodiments, the page 400 may include one or more user-selectable filters 404-412 with which to limit the number of jobs returned and or displayed. In the illustrative embodiment, the filters 404 list a number of skills, for example 'JAVA', 'AJAX', LAMP' and so on that are relevant to the job title entered—'Java Engineer'. One skilled in the art would readily understand that such filter sets, having close relevance to the position title entered in the field 302 may be dynamically-generated. An embodiment may include a list of skill or other filters that are mapped to one or more job titles. An embodiment may generate the filter set in real time from the skills listed in the successful job listings returned as a result of the search.

In an embodiment, the filters serve to filter display of the returned output. In other embodiments, the filters are appended as search terms to the user-supplied search term, thus narrowing the user-entered search and limiting output.

In other embodiments, filter sets may provide filters that do not directly relate to the actual job title, for example filters for level of experience, previous jobs, earning history, geographic locations, and so on.

In addition to skill-based filters 404, various embodiments may also provide or more of:
  category-based filters 406;
  salary-based filters 408;
  location-based filters 410;
  and rating based filters 412.

In an embodiment, the page 400 displays a list 402, based on the search terms entered, such as a job title, of the most successful job titles returned in response to the user query, based, at least in part, on the shortest time to fill: days-to-present and days-to-start (not shown). The titles and descriptions displayed are of actual jobs that were filled in the user's locale. A fundamental assumption underlying the platform is that every job is as unique as the hiring manager, team, company and location to which it reports.

In an embodiment, the user may choose the title that corresponds most closely with the user's goals and objectives regarding the position to be filled. When the user chooses the job listing, the user's job listing may automatically inherit the attributes of the industry, job category and geography of the chosen job listing. Additionally, the user is enabled to pick and choose parts of the job description that he/she likes, or he/she can edit the descriptions or draft his/her own description from the beginning. Thus, the platform provides a means for user-generated content to drive the creation of further user-generated content.

In an embodiment, the list 402 may include, for each job, a field 412 containing the number of days it took to find the right candidate. In an embodiment, the list 402 may include, for each job, a field for the number of days it took to make a hire (not shown). Additionally, for each job, the list may include a user interface elements such as a button that displays the entire position description, described in more detail herein below.

In an embodiment, the page 400 may include a listing of the user's previous job listings. Thus, the user is able to quickly review previous hiring campaigns executed on the platform, enabling him/her to easily adopt a previously-used job listing, in whole or in part and further simplifying the task of drafting a job listing that has a high likelihood of success.

In an embodiment, the page 400 may include a listing of jobs in the user's industry measured against benchmarks, unrestricted by the search terms contained in the job title entered into the field 302.

In an embodiment, the page 400 may include a listing of placement consultants particularly qualified to assist the user in his/her hiring campaign. As described in greater detail herein below, the platform provides a basic level of service and a number of upgrade options, each with its own price point. In an embodiment, the selection of a hiring consultant to assist with the campaign would constitute an upgrade to a higher support level, with a coincident increase in the price of the service.

In an embodiment, the page 400 may include a 'Need an Expert?' button 420 or other such UI element that provides an alternative way to access the higher level of service represented by hiring an expert.

In an embodiment, the page 400 may include a progress bar or similar element to indicate to the user the stage he or she has reached in the design of a hiring campaign which is conducted on the platform.

Figure 5:
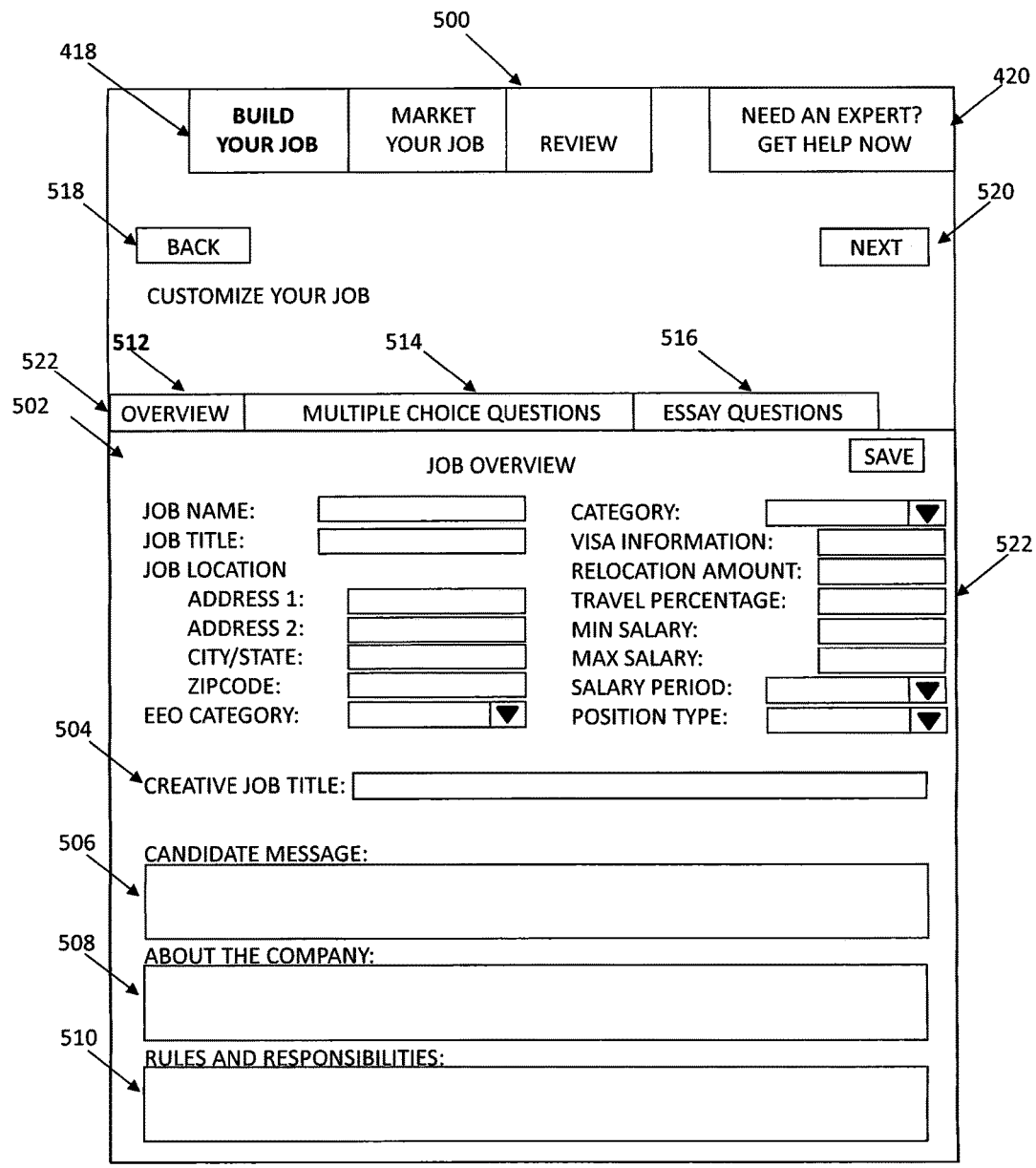
FIGS. 5 and 6 provide screenshots of pages for editing a job listing from a heuristically-driven platform and method for hiring based on previously-supported successful jobs.

FIG. 5 provides a first screenshot of a page 500 for editing a job listing 502 from a heuristically-driven platform and method for hiring based on previously-supported successful jobs. In an embodiment, the job listing 502 includes several pages, each of which are accessed by means of a series of tabs 512-516. In an illustrative embodiment, the job listing 522 contains three pages: 'Overview', 'Multiple Choice Questions' and 'Essay Questions', each page accessed by selecting the associated tab. In FIG. 5, the 'Overview' page is shown, including a collection 522 of fields for listing factual information about the listed job. An illustrative embodiment may contain fields for one or more of:

Job Name;
Job Title;
Job Location, including one or more of: Address1, Address2, City/State, and Zip Code;
EEO Category (Equal Employment Opportunity);
Industry;
Job Category/Department;
Job Level;
Visa Information;
Relocation Amount;
Travel Percentage;
Minimum (Min) Salary;
Maximum (Max) Salary;
Salary Period;
Position Type; and
Creative Job Title.

In addition to the fields 522, the overview job listing 502 may contain one or more text fields containing a narrative description of the job. In an illustrative embodiment, the text fields may include one or more of:

Candidate Message 506;
About the Company 508; and
Roles and Responsibilities 510.

In an embodiment, the page 500 and succeeding pages may contain a 'Back' button 518 and a 'Next' button 520 for navigating between stages of the design process. Additionally, a progress bar 418 indicates the level of progress achieved. A 'Need an Expert?' button 420 allows the user to upgrade to a higher support level.

Figure 6:
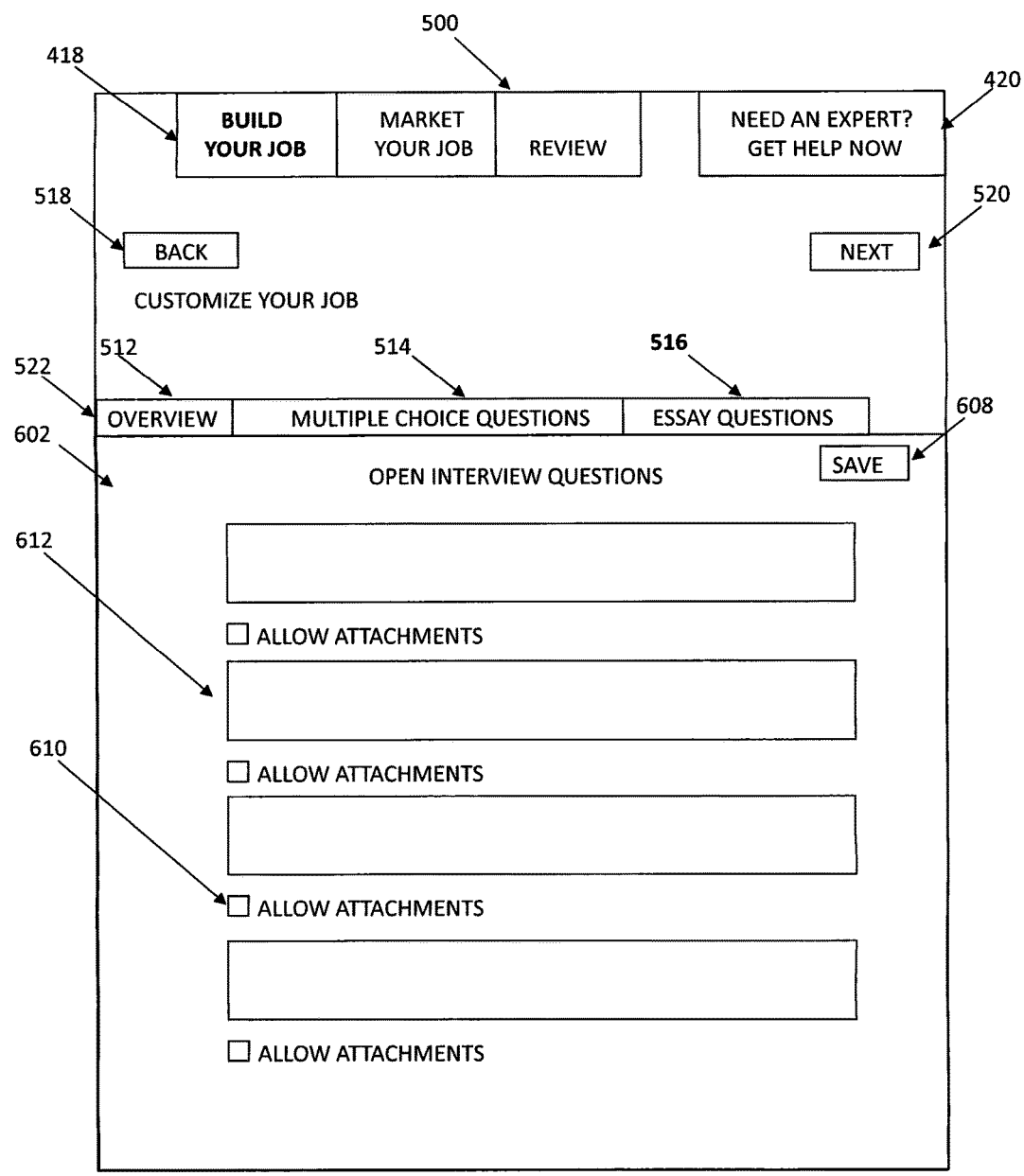

FIG. 6 provides a second screenshot of a page 500 for editing a job listing from a heuristically-driven platform and method for hiring based on previously-supported success jobs. As shown in FIG. 6, activation of the tab 516 grants access to the 'Essay Questions' 602 section of the page 500. In an embodiment, the section 602 includes at least one text field 612 into which the user may enter one or more open interview questions. After the user completes the task of entering questions into the fields 612, activation of a 'Save' button 608 saves questions to memory. In an embodiment, by selecting a UI element 610, such as a checkbox, the user is able to activate an 'Allow Attachments' feature, which configures that page to accept attachments from a job candidate completing the form.

In addition to the materials that are available from successful jobs—the titles and descriptions, the two-stage interview may also include, for example, questions about geographic limitations or salary limitations.

In an embodiment, the two-stage interview may include salary questions such as "My desired annual salary is _____" or "My last year's W2 will show that my salary is _____". To answer a question about salary, the applicant may be provided a series of ranges from which to choose.

Figure 7:
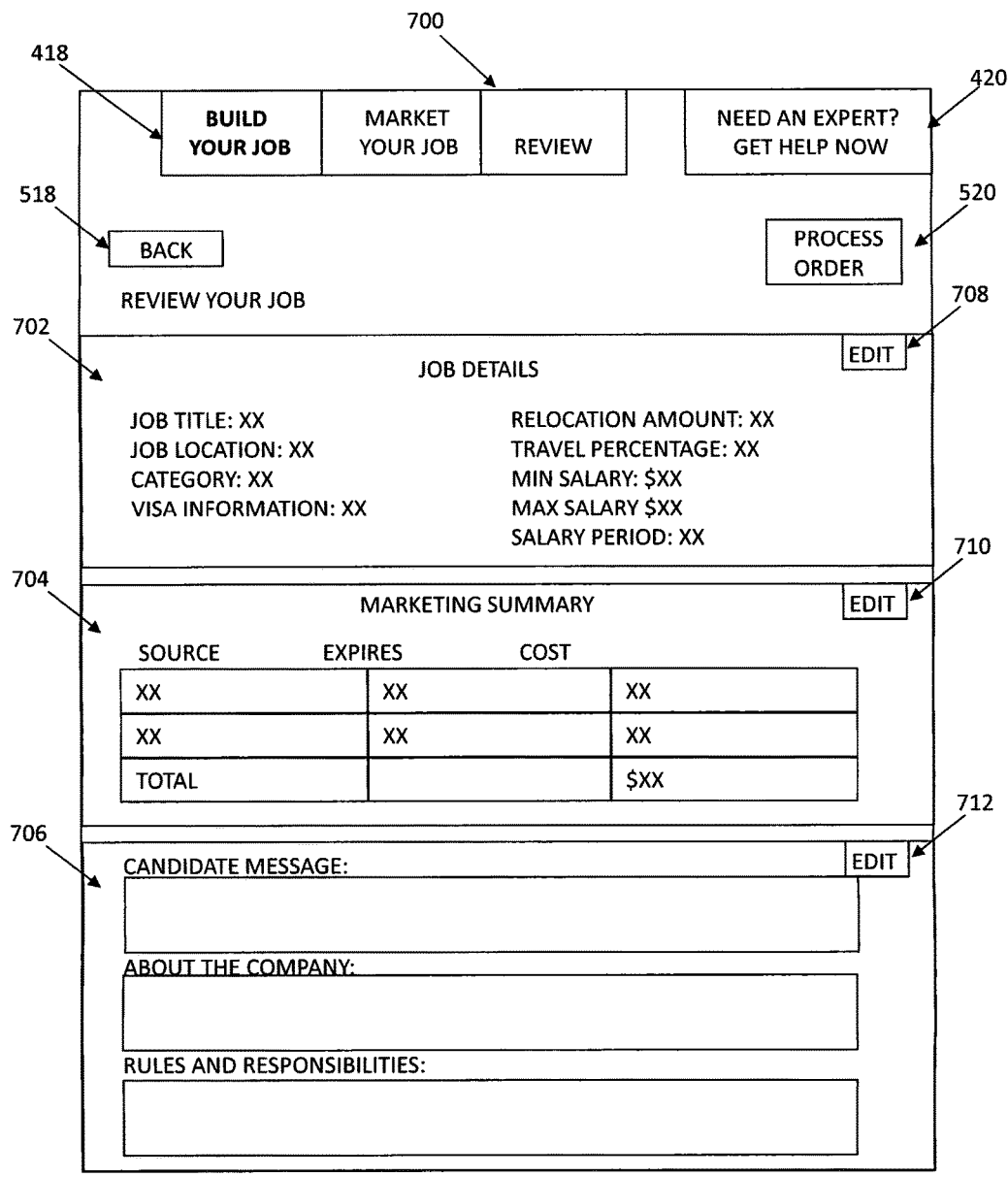
FIG. 7 provides a screenshot of a page for reviewing a newly-created job listing from a heuristically-driven platform and method for hiring based on previously-supported successful jobs.

Arriving now at FIG. 7, a screenshot of a page 700 for reviewing a newly-created job listing from a heuristically-driven platform and method for hiring based on previously-supported successful jobs is shown. Once inherited or created, the user can change the job description, questions and scoring in any way desired. While most hiring managers appreciate well-written and appropriate job descriptions and interview questions, they may lack the time, desire or skill to develop them from the beginning. Such tasks are greatly simplified by the present platform in which job listings are created from previously successful job listings.

In an embodiment, the user may add, modify or delete interview questions as desired. He/she may change the scoring for each question as well as make any question a 'knockout' or an 'automatic forward'. In an embodiment, the page includes a number of fields 702-706 corresponding more or less exactly to the fields described in relation to FIGS. 5 and 6. Here, fields for 'Job Details' 702, 'Marketing Summary' 704 and 'Job Description' 706 are shown. It will be readily realized, in fact, that the page 700 contains a corresponding field for every field in the pages 500 and 600. Additionally, in an embodiment, each field contains an 'edit' link 708, 710 and 712. Thus, after generating the job listing, the 'Review' page allows the user to readily proof-read the job listing and quickly make edits without returning to the original Job Listing pages.

Figure 8:
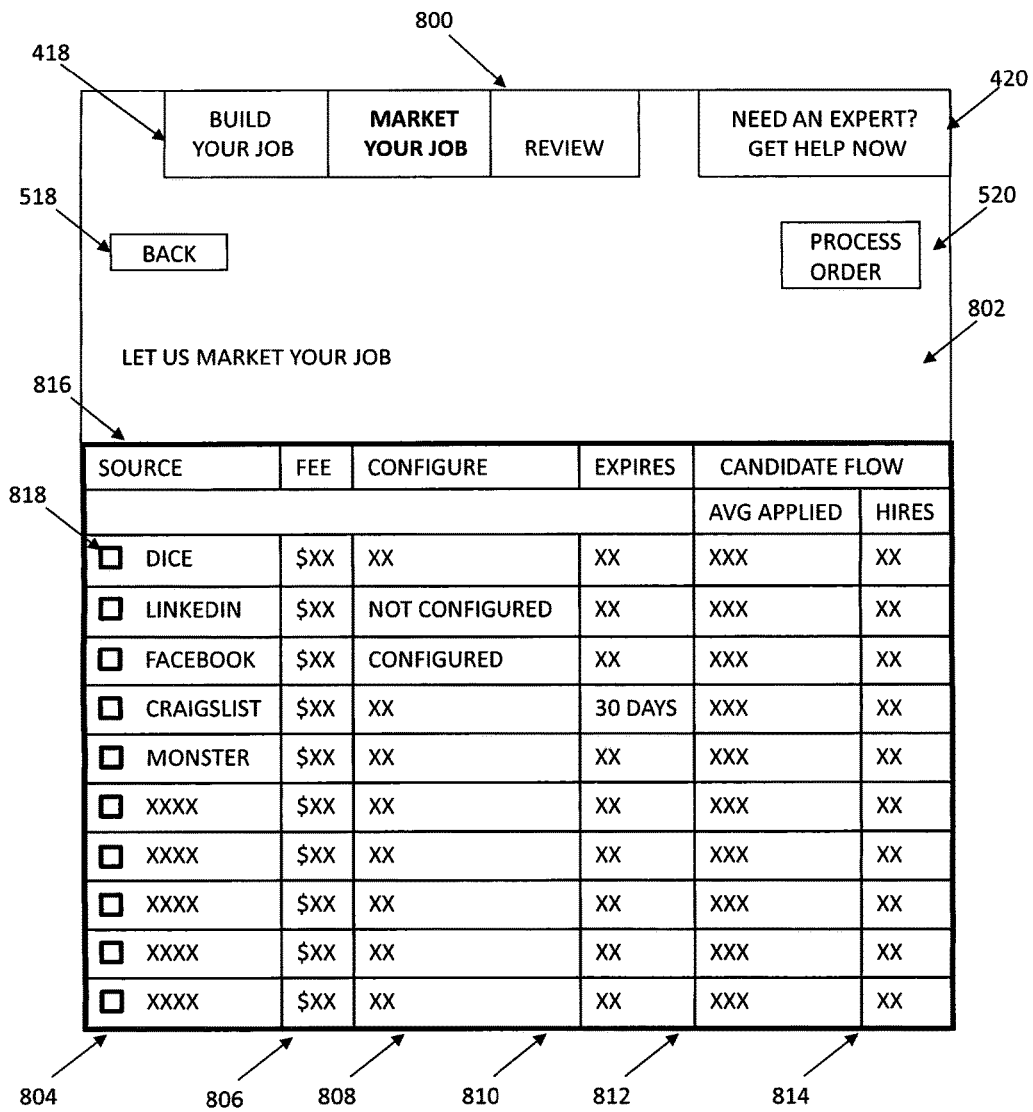
FIG. 8 provides a screenshot of a job marketing page from a heuristically-driven platform and method for hiring based on previously-supported successful jobs.

It will be noticed, looking at FIG. 8, that the progress bar 418 indicates that the user has completed the 'Build your Job' phase of the hiring process and has entered the 'Market Your Job' phase. As previously explained, once the user has completed the task of building an effective job listing, the platform may assist the user in designing a plan to market the job. The platform allows the user to see which applicants were hired from each source. Guided by such information, the user no longer has to guess which venues are the most effective sources of applicants for a particular job and company and geographic location. In an embodiment, the page 800 may have a checkbox that allows the user to automatically include all free venues. Thus, he/she can choose, for example, LINKEDIN, FACEBOOK and CRAIGSLIST. As shown in FIG. 8, DICE was the number one source for similar jobs, so the user may have chosen to add DICE at an additional charge. In an embodiment, each venue may be separately configured because each job board may possess unique nuances that are only fielded centric to the specific venue.

Turning again to FIG. 8, shown is a screenshot of a job marketing page 800 from a heuristically-driven platform and method for hiring based on previously-supported successful jobs. Using the platform, a hiring manager is relieved of the need to guess where to find the right candidates for a job. As in FIG. 8, it is shown where each candidate source ranked in terms of the number of applicants and hires for JAVA developer jobs—eliminating most or all of the guesswork in choosing marketing venue. In this case, the user can tell with great accuracy that DICE was the number one place to find JAVA developers similar to who the user is seeking. As shown, DICE is a fee-based venue, so selection of DICE may incur an additional fee over and above the basic fee. The user may want to begin the search using only those candidate sources that are included with the base cost.

As the user clicks on each individual candidate source, a screen may open up where additional detail for that source can be provided. Without leaving the application, the user can reach out, for example, to his LINKEDIN contacts to find referral sources and, ultimately, the best person for a particular job.

In this way, the most popular and effective candidate sources are baked into the platform and process. A user need not go to LINKEDIN to look through his LINKEDIN network. He or she can simply search and engage them right on the platform.

In an embodiment, the job marketing page 800 may present a listing of marketing sources recommended by the platform for marketing the user's particular job. It is to be appreciated, of course, that an additional important aspect of a successful hiring campaign is choosing venues for publishing a position that provide the greatest opportunity for success. In addition to maximizing the opportunity for a successful campaign, the user typically prefers those venues that are able to maximize the opportunity for success while keeping costs as low as possible. Because an embodiment of the platform includes an archive of data on large numbers of successful hires, based on these successful hires, it is able to recommend a list of venues, targeted to the job and to the employer that are most likely to lead to a successful hire for the job in shortest amount of time, while conserving resources as much as possible.

In an embodiment, the listing 802 may constitute a display of a data structure 816, such as a table, wherein the table may have a plurality of columns, each column displaying a particular element of data describing a marketing venue for a job. In an illustrative embodiment, the table 816 may include columns for:

Board 804;
Fee 806;
Configure 808;
Expires 810;
For the technology category:
  Average applicants 812; and
  Number of hires 814.

In an embodiment, a UI element 818 such as a checkbox adjacent each listed venue in the 'board' column 804 allows the user to include a board by selecting it. The act of selecting a venue, or board, automatically grants the user access to the selected board to enter the necessary information to market the job. As shown in FIG. 8, the exemplary campaign includes 'Monster' and 'Career', the checkboxes adjacent these boards having been selected by the user. The 'Fee' column 806 lists the fee charged for a job listing on each board. It will be noticed that there may be fee-based options and options that are included in the basic fee for the service. Here, both boards chosen by the user are included in the basic service fee.

It will be noticed that, in the 'Configure' column 808, the status of the two selected venues has been updated from 'Not Configured' to 'Configured', meaning that the user has provided the information necessary in order to list the job on these selected boards. The 'Expires' column 810 lists the expiration date of the listing. Here, expiration dates are given for each selected board. The columns 812 and 814 for 'average number of applicants' for each position and 'number of hires' are important indicators by which the user can judge the effectiveness of the particular board at drawing large numbers of Applicants and effectiveness at drawing qualified applicants that are more likely to result in a hire.

Figure 9:
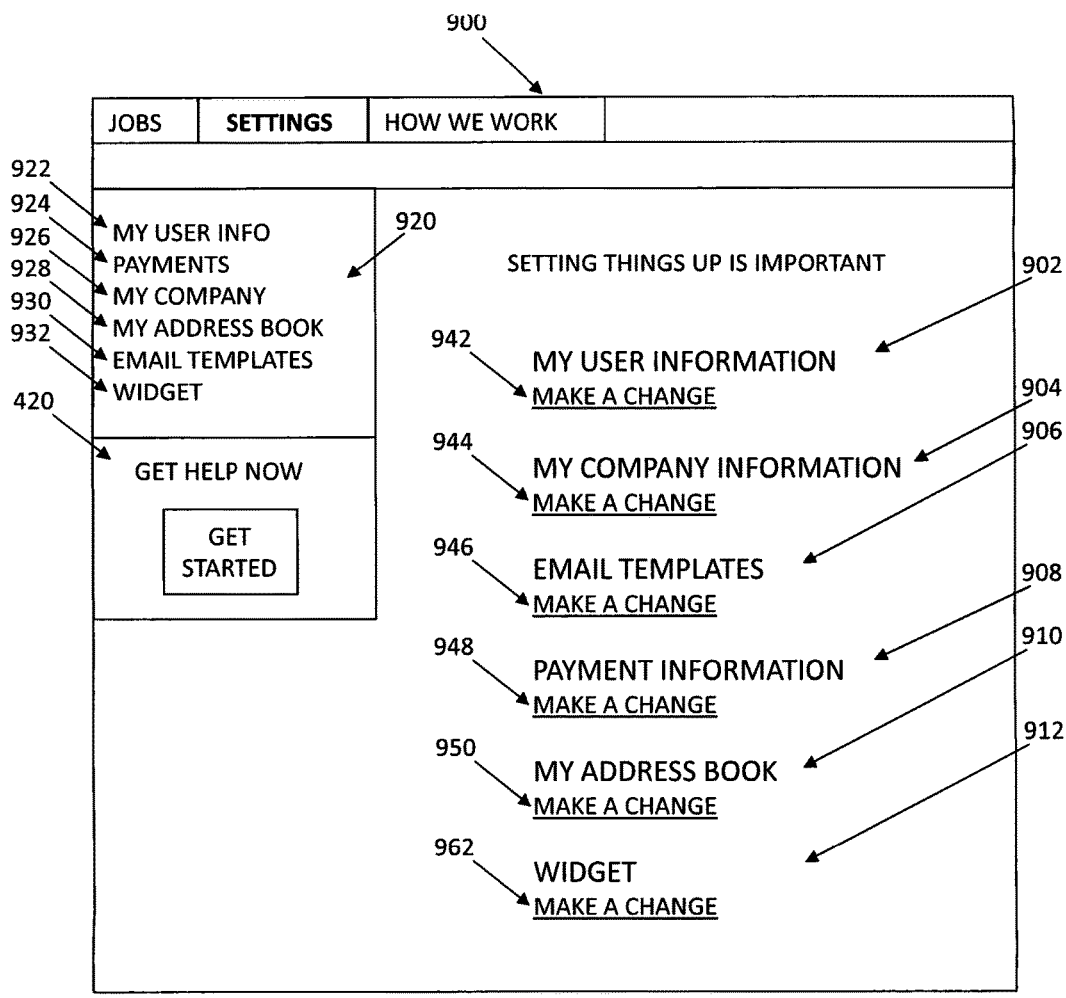
FIG. 9 provides a screenshot of a page for configuring user settings from a heuristically-driven platform and method for hiring based on previously-supported successful jobs.

FIG. 9 provides a screenshot of a page 900 for configuring user settings from a heuristically-driven platform and method for hiring based on previously-supported successful jobs. As the user goes through the stages of designing a hiring campaign, the user's progress is reflected in the progress bar 418 shown in any of FIGS. 4-6 and 8-9. After the user completes 'Market Your Job' as shown in FIG. 8, the user is navigated to a page 900 for configuring user settings, an aspect of the 'register' stage of the process. In an embodiment, configuring users setting can include configuring one of more of:

User information 902;
My Company Information 904;
Email Templates 906;
Payment Information 908
My Address Book 910; and
Widget 912.

It will be readily understood that choice of categories for user settings is application-specific and that the foregoing category listing is merely exemplary only and therefore not limiting.

'User Information' 902 allows the user to update at last one of: name, address, password and phone numbers.

'My Company Information' 904 allows the user to update at least one of company address, support email and company overview and tag line.

'Email Templates' 906 enables the user to update at least one of: notification and referral emails that are generated automatically when the user takes significant decisions in the hiring process, such as 'interview', 'hire' and 'do not hire'.

'Payment Information' 908 enables the user to update payment information such as credit card information, view recent charges and to print out an invoice.

'My Address Book' 910 allows the user to add or change email address so that the users colleagues may be alerted to job opportunities.

'Widget' 912 allows the user to customize a job widget that allows the user to post opportunities on the user's own website, blog or intranet.

The user may gain access to an 'edit' form (not shown) for each of the above categories in at least two different ways: on the page itself, 'Make a Change' links 942-962 navigate the user to pages from which the user is able to update or edit the foregoing settings. In addition, a menu of links 920-932 provides an alternate path to the same update pages.

Figure 10:
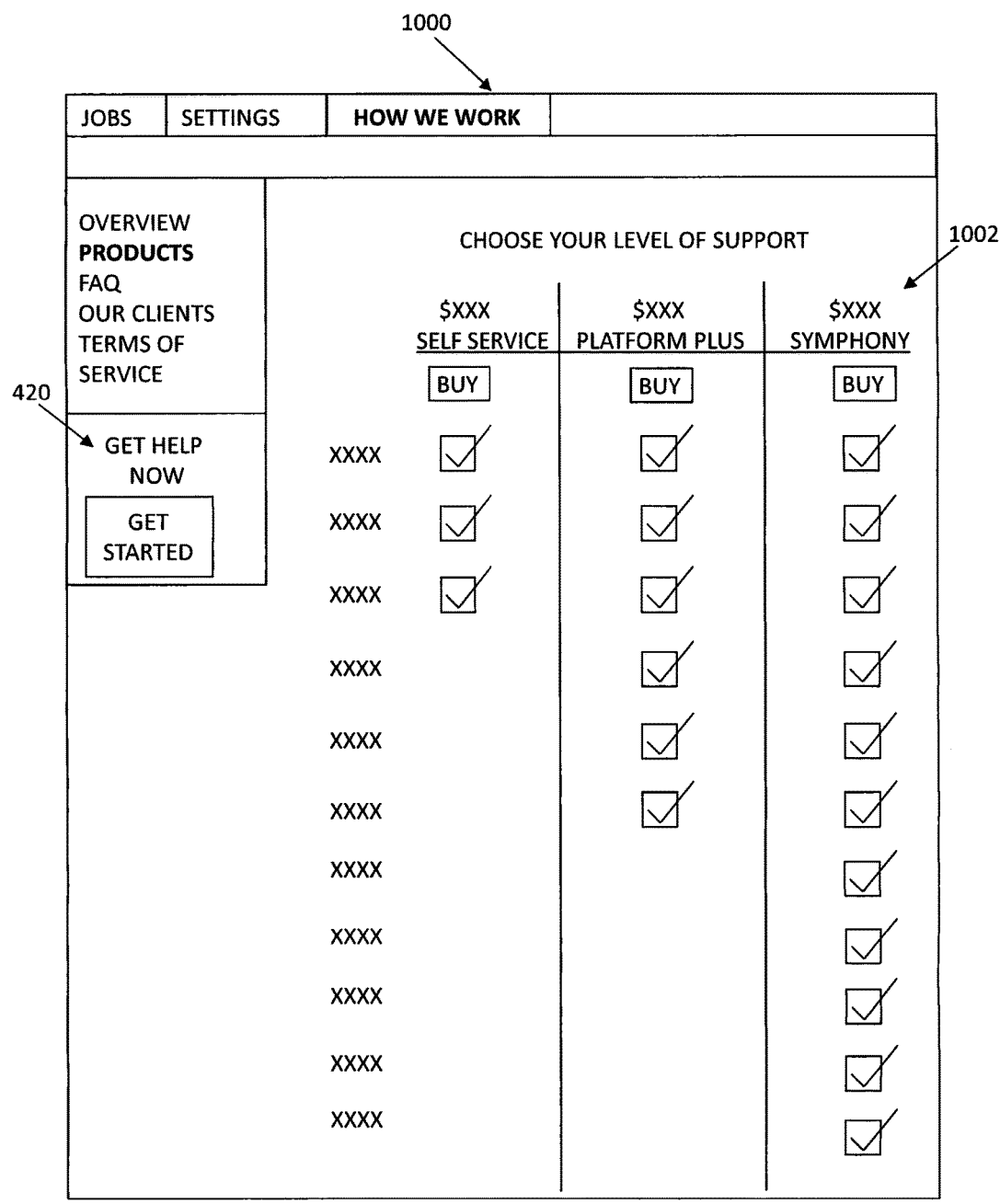
FIG. 10 provides a screenshot of a products page from a heuristically-driven platform and method for hiring based on previously-supported successful jobs.

FIG. 10 provides a screenshot of a products page 1000 from a heuristically-driven platform and method for hiring based on previously-supported successful jobs. As previously explained, a number of different support levels 1002 are available to the user, each level offering successively more features than the preceding support level. An exemplary embodiment offers, for example, three levels of support: 'Self-Service', 'Platform Plus', and 'Enterprise'. A basic support level, optionally designated 'Self-Service', offers an array of services that may include, for example:

Hiring Software usage;
Access to a Career Referral Network;
Access to On Demand Hiring Consultants and a Certified Recruiter Network;
Social Network Integration and employee referral network expansion;
Hiring Knowledgebase access;
Reference and background checks.

In an embodiment, an intermediate support level, optionally designated 'PlatformPlus' may offer the service array of the 'Self-Service' level plus one or more of the following services:

Hiring performance reporting and Quarterly staffing activity report; and
'Careers' page support.

In an embodiment, an advanced support level, optionally designated 'Enterprise' may offer the service arrays of the preceding levels plus one or more of the following services:

Hiring plan development;
No-cost posting to major job boards;
Offer and Closing assistance;
Hiring manager and candidate process facilitation;
Full EEOC and OFCCP reporting (Equal Employment Opportunity Commission; Office of Federal Contract Compliance Programs);
Inclusive sourcing; and
Job Profiling.

In an embodiment, the pricing structure for the support levels may reflect the increasing number of services available at each succeeding level. For example, the price point for the basic level is less than those for either the intermediate or advanced levels. The price point for the intermediate level is greater than that for the basic level and less than that for the advanced level. The price point for the advanced support level is greater that that for the basic and intermediate support levels.

The foregoing array of support levels and the arrays of services associated with each support level are exemplary only and are not intended to be limiting.

FIG. 11 provides a screenshot of an upgrade page 1100 from a heuristically-driven platform and method for hiring based on previously-supported successful jobs. As previously explained, the platform offers users a number of support levels. As shown in FIG. 11, an upgrade path is provided by which users at the basic and intermediate support levels can upgrade to a higher support level, thus enabling users to take advantage of the greater array of services available at the higher support levels.

In an embodiment, an upgrade page 1100 may include one of more of the following elements:

a 'Message' field 1102;
a 'Job Title' field 1104;
a 'Job Location' field 1106;
a 'Category' field 1108;
a 'Support Level' field 1110;
a 'Preferred Hiring Consultant' field, 1112; and
a 'Submit' button 1114.

To facilitate data entry, one or more of the above fields may be configured as, for example, a pull-down menu or a set of checkboxes or radio buttons. As shown in FIG. 11, for example, the 'Job Location' 1106 and 'Category' 1108 fields are configured as pull-downs and the 'Support Level' 1110 is configured as a set of radio buttons. As shown, a support level upgrade can be accomplished by selecting either 'Enterprise full support' or 'PlatformPlus support' in the 'Support Level' 1110 field.

Additionally, the exemplary page 1100 includes a caption advising the user wanting to upgrade the support level for an existing job to return to one of the details screens for the specific job and select the 'Upgrade' button 420 on that page.

The present platform and approach provides a continuum from a knowledge-driven self-service offering all the way through to a high-touch option involving a hiring consultant, effectively makes the hiring consultant an extension of the platform, instead of the platform being a tool for the hiring consultant.

Figure 12:
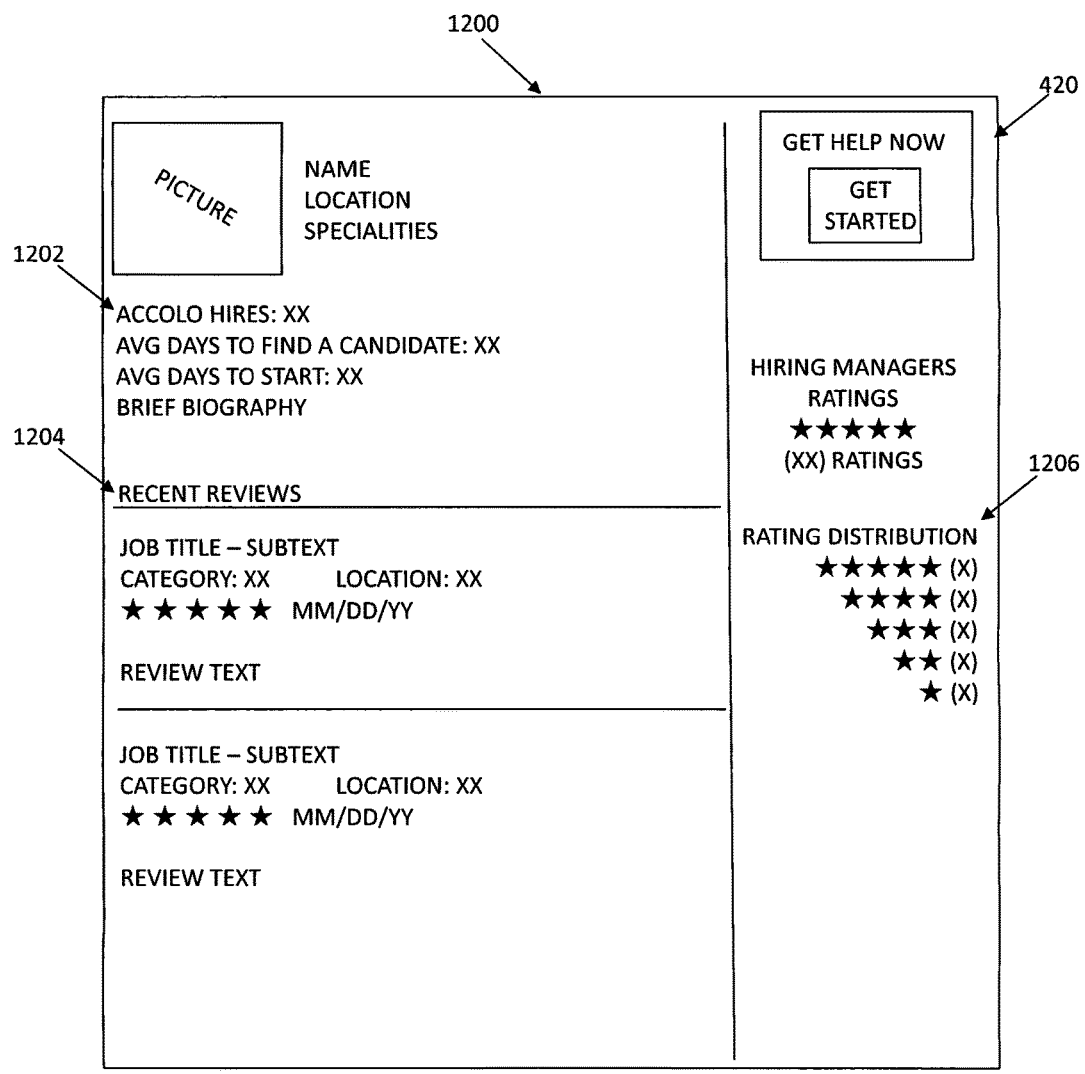
FIG. 12 provides a screenshot of page providing information about a hiring consultant from a heuristically-driven platform and method for hiring based on previously-supported successful jobs.

FIG. 12 provides a screenshot of a page 1200 providing information about a hiring consultant from a heuristically-driven platform and method for hiring based on previously-supported successful jobs. Most of the foregoing pages include an 'Upgrade' button 420 with which the user can upgrade to a higher support level. Additionally, the 'Upgrade' button 420 allows the user to access paid service options without upgrading the overall support level. One of the paid service options available to the user is that of hiring a professional hiring consultant to design a hiring campaign for a job.

In an embodiment, the platform includes a network of professional hiring consultants from which one or more individuals can be referred to the user upon request. In an embodiment, the referrals are based, at least in part, on the hiring consultant's expertise and experience in relation to the type of job. For example, a user seeking to hire an experienced JAVA developer is given referrals to hiring consultants having knowledge and expertise with that industry segment and position.

In fact, based on its store of data regarding hiring consultant qualifications and track record, the platform has, built into it, the intelligence to select the right human expert to whom the user is to be referred. Accordingly, the user can count on being connected to the best hiring consultant based on a comparison of the appropriate metrics. Thus, a hiring consultant referred to help fill a job for a JAVA programmer will be the one in a selected geographic region who has the highest hiring manager satisfaction score and the shortest time to fill.

In an embodiment, the hiring consultant information page provides professional information 1202 about the hiring consultant such as his/her geographic location and professional specialties. In an embodiment, the professional information may include one or more narrative paragraphs describing the hiring consultant's experience. In an embodiment, the professional information may include a summary of the hiring consultant's performance, for example: number of hires, average days to find a candidate, average days to start and so on.

In an embodiment, the page 1200 may contain one or more narrative reviews 1204 posted by previous clients of the hiring consultant.

In an embodiment, the platform provides users the capability of assigning star ratings to hiring consultants. The page 1200 may include a summary of the hiring consultant's star ratings. In an embodiment, the summary may be a ratings distribution, for example, a bar graph that indicates the total number of ratings received in each star category. Such a ratings summary is exemplary only and is not intended to be limiting.

Considered in a more general sense, the present platform and approach constitute a significant evolution of the SaaS (Software-as-a-service) model. In an embodiment, the platform constitutes a software application wherein the application and associated data are centrally hosted, with users accessing the application and data by means of a client such as a web browser. The present platform nonetheless realizes that live experts are necessary for performing certain tasks. Thus, the platform with all of its associated knowledge is a software entity that can live on its own technically as a SaaS platform, continue to grow based on usage, combined with the actual people who will do the work if they are needed, all in one very simple-to-use platform.

Figure 13A:
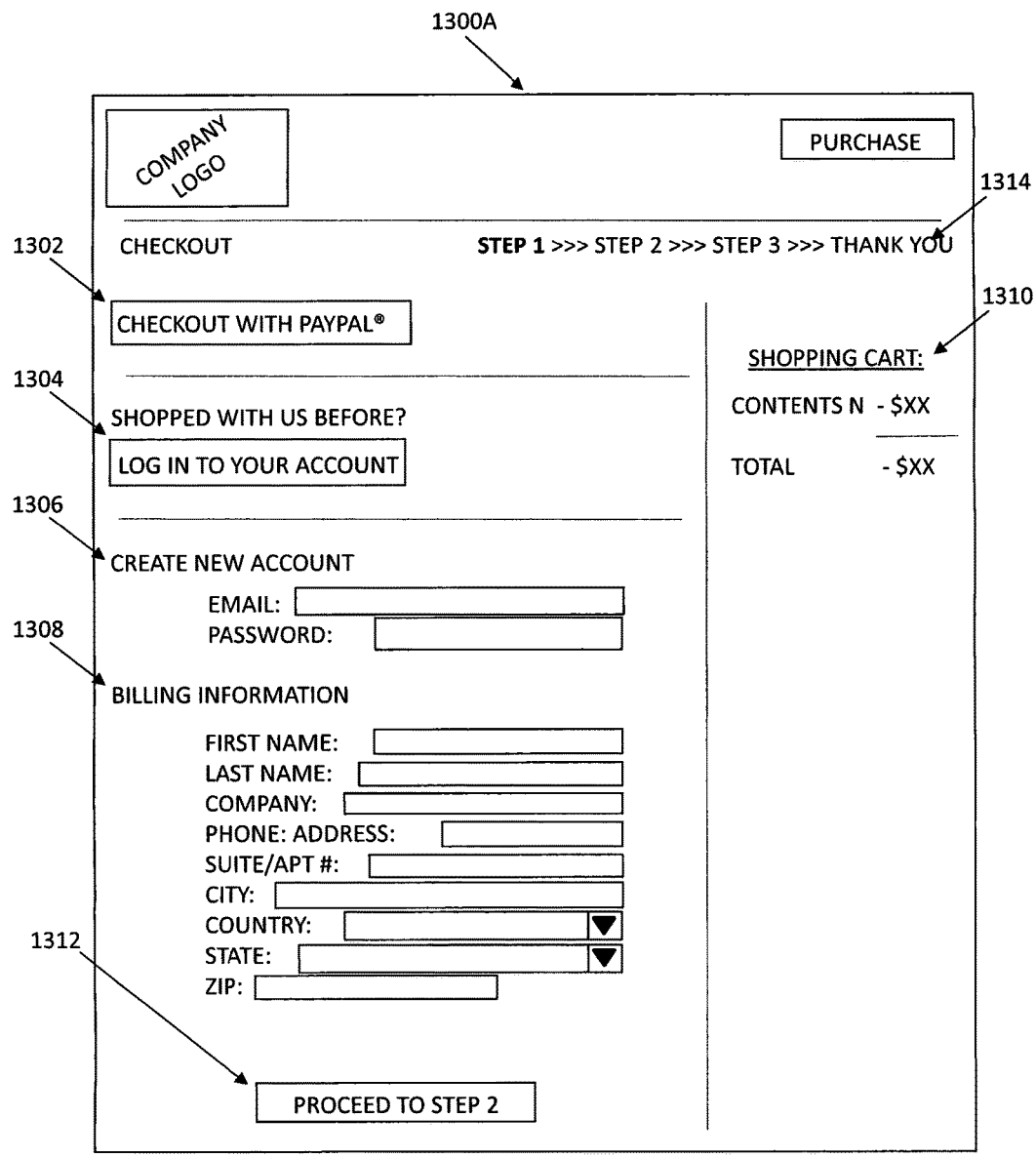
FIGS. 13A and 13B provide screenshots of a checkout page from a heuristically-driven platform and method for hiring based on previously-supported successful jobs.
Figure 13B:
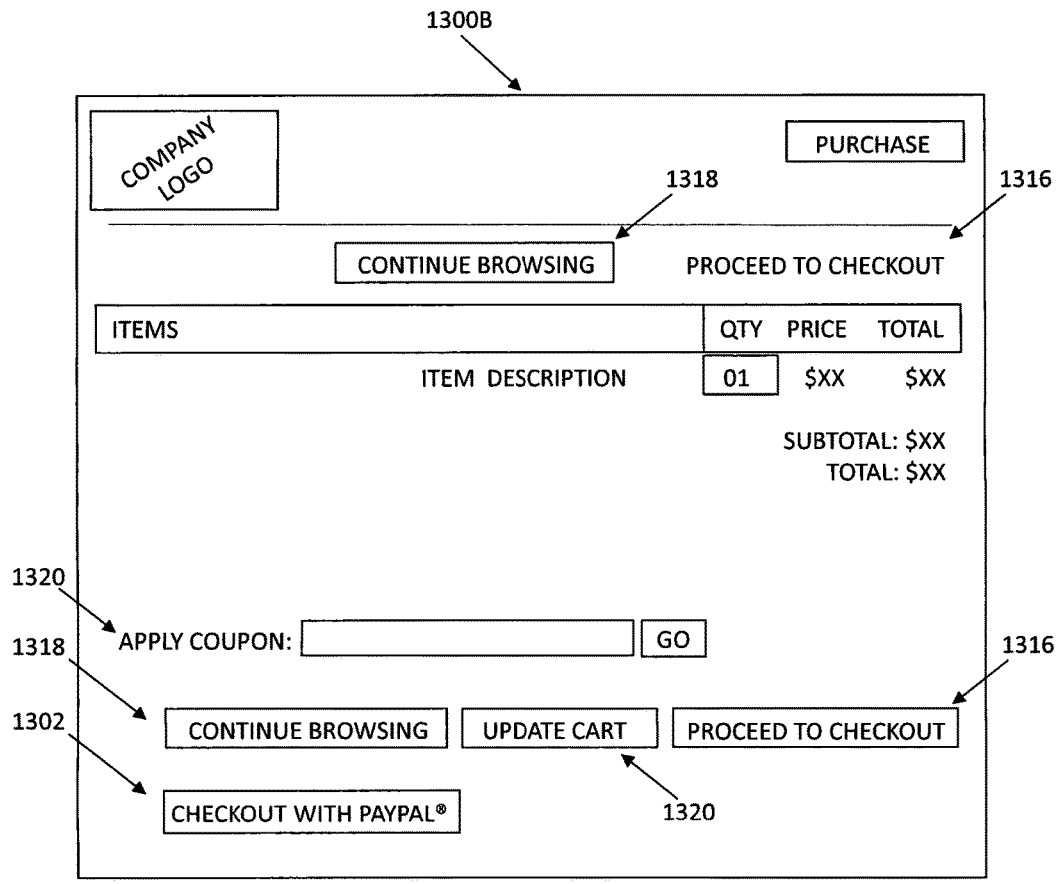

FIGS. 13A and 13B provide screenshots of a checkout page from a heuristically-driven platform and method for hiring based on previously-supported successful jobs. As shown in the progress bar 418, in an embodiment, the final step in the process of creating a job listing and marketing the job is typically purchasing the service, although the platform allows the user wide leeway in selecting the order for performance of the various steps in the process. FIGS. 13A and 13B provide screenshots of a checkout page 1300 on the platform.

In an embodiment, the page 1300A may include one or more UI elements 1302 such as buttons that permit access to various third parties. For example, as shown in FIG. 13A, a button 1302 allows the user to access a PAYPAL (PAYPAL INC., Omaha, Nebr., USA) account that allows the user to check out securely without sharing financial information such as a credit card account number.

In an embodiment, the page 1300A may include a UI element 1304 for registered users to authenticate to their accounts before purchasing.

In an embodiment, the page 1300A may include one or more UI elements 1306 that allow an unregistered user to access a service for creating an account on the platform. In an embodiment, during a registration process, the unregistered user may be asked to associate authentication information such as an email address and/or a password with an account newly created for the unregistered user.

In an embodiment, the platform accepts billing information entered by the user by means of a series of UI elements 1308 such as text fields. In an embodiment, the text fields may include fields for entering at least one of:
First name;
Last name;
Company;
Phone;
Address;
Suite/Apt #;
City;
Country;
State; and
Zip code.

It will be readily understood that the above array of text fields is merely exemplary and not intended to be limiting.

In an embodiment, the platform may include a shopping cart service. The page 1300 may include one or more UI elements 1310 for displaying current content of the shopping cart and the cost for each item. As shown in FIG. 13A the process of supplying billing information is identified as Step 1 in the checkout process. In an embodiment, UI elements 1312 or 1314 navigate the user to the next step in the check out process.

In an embodiment, the page 1300B may display a completed listing of the shopping cart contents along with a subtotal and the total purchase amount.

In an embodiment, the platform may accept various discounts, such as affinity group discounts and other promotional discounts. As shown in FIG. 13B a UI element such as a data entry field 1320 allows the user to enter a coupon number or other promotional code in order to take advantage of one or more discounts for which the user may be eligible. Instead of checking out, the user may elect to continue browsing via a 'continue browsing' UI element 1318. Otherwise, the user typically proceeds to final purchase by activating a 'Proceed to Checkout' UI element 1316.

Figure 14:
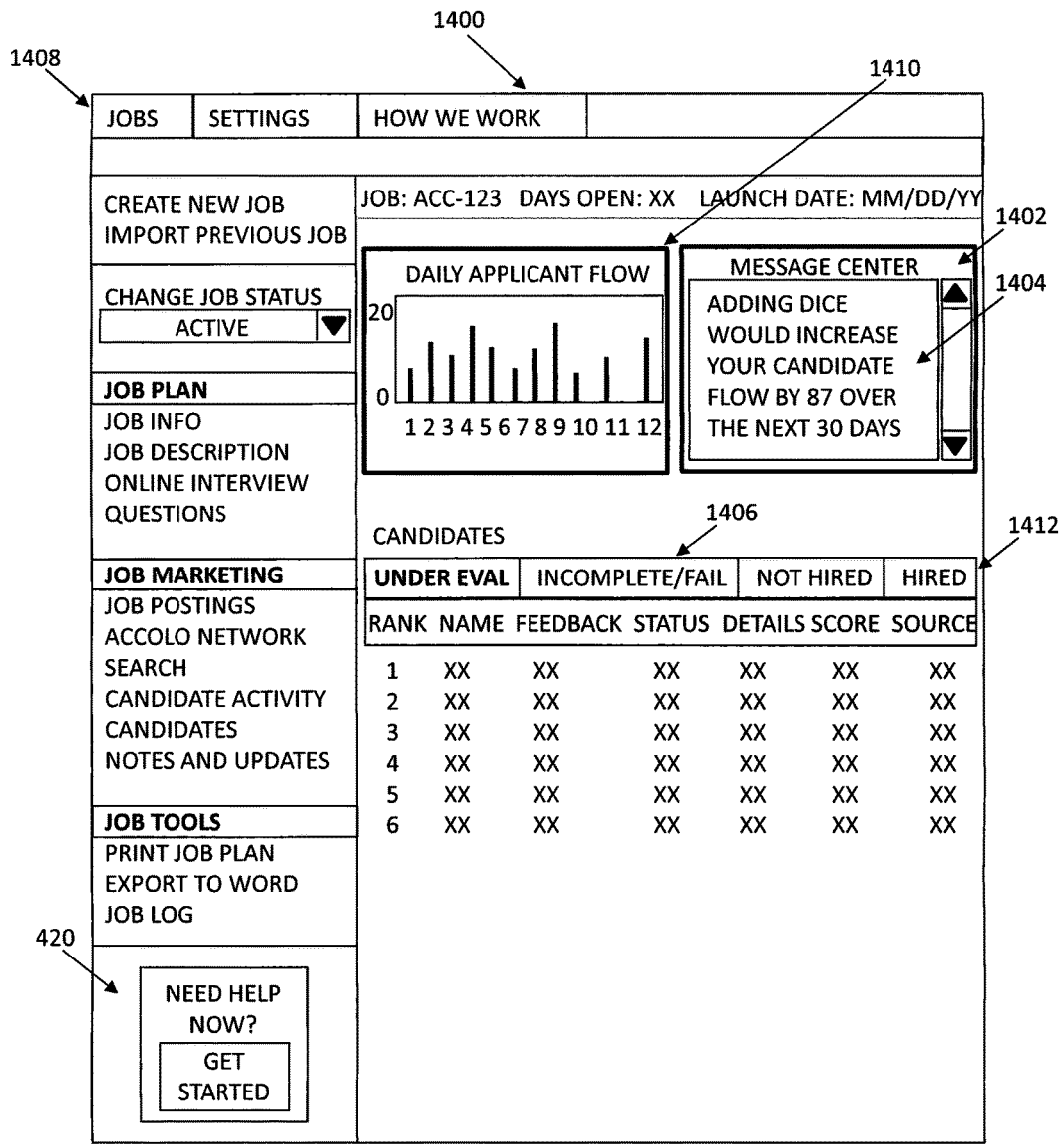
FIG. 14 provides a screenshot of a page summarizing results from a hiring campaign from a heuristically-driven platform and method for hiring based on previously-supported successful jobs.

FIG. 14 provides a screenshot of a portal page 1400 containing a result summary 1410 from a hiring campaign for a job from a heuristically-driven platform and method for hiring based on previously-supported jobs.

The platform has the ability to collect a great deal of information on the success of various entities—the success of a particular medium for a particular type of job in terms of marketing, the success of a title, the success of a description, the success of particular questions. The information is collected, accumulated in the database and organized to be searchable and re-combinable.

The platform itself provides users a front-end that can harvest the information and assemble it into a particular combination that the hiring manager wants for a particular job and broadcast it through particular channels for marketing based on the fact that what the hiring manager is doing has been proven to be successful in the past from such metrics as how long it takes to build a job, how long the person lasted on the job, whether they cleared their probationary period, and so on.

As previously described, after the processes of building the job, marketing the job, reviewing the job and purchase are complete, the job is launched: the platform creates a unique URL and a unique Web page for every single job, making it infinitely portable. As a job's web page is distributed across and through all appropriate mediums such as social networks, job boards and user groups, people apply through the online process by selecting an "Apply Now" button on the page. FIG. 14 provides a screenshot of a page 1400 from a message center summarizing results 1402 of a hiring campaign for a particular job in a heuristically-driven platform and method for hiring based on previously-supported jobs.

In an embodiment, after the job goes live, the platform monitors the progress of the job by the hour and by the day. Such progress monitoring allows the platform to detect after a short period of time if the success of the job is less than expected, based on the success data for previously support jobs. In an embodiment, if, after a predetermined period of time after the job goes live, the number of applicants is outside of a standard deviation of a success path computed from the relevant data, the platform has the capability of alerting the user, possibly noting, for example that the job needs more marketing distribution and giving the user an option to go back to the distribution screen to select additional venues, or better venues. Additionally, it may be suggested to the user that they upgrade to get hiring consultant help.

In the event of an upgrade, the user is referred to the most effective hiring consultant, fully trained and certified on the platform, by responding "yes" to the upgrade suggestion. Because the entire process is integrated within a single platform, the platform, fed by earlier user-generated data, continually accumulates more and more user-generated data, based on what is actually happening in the hiring campaigns. Thus, because all the jobs are managed from start to finish through the platform, the platform possesses an adaptive capability, amassing a continually greater wealth of data about how to describe the jobs that are the most successful, where to go to find applicants, what to do and what the flow should be in real time, with the result that the platform adaptively grows smarter with every job listed.

Figure 17:
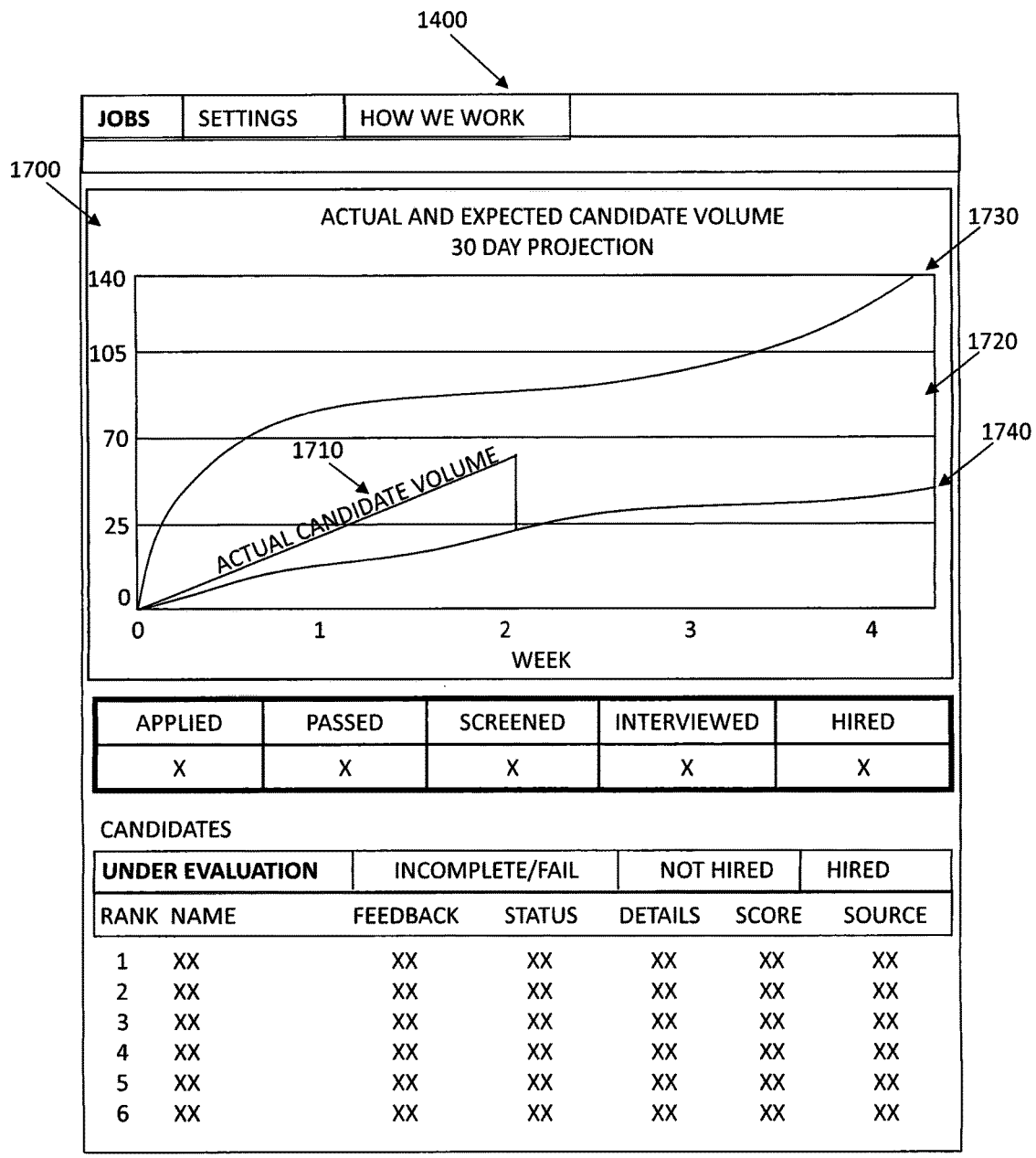
FIG. 17 provides a screenshot of diagram summarizing the actual result of a campaign against a projection of results for a predetermined time period.

Referring again to FIG. 14, in an embodiment, a bar graph 1410 shows the candidate volume for each day of the campaign. In an embodiment, as shown in FIG. 17, a page 1400 includes a graph 1700 showing the actual candidate volume per day 1710 against a projection 1720 of expected candidate volume for each day of a predetermined time interval. In the embodiment of FIG. 17, the time interval is 30 days. However, such interval is provided only for descriptive purposes and is not intended to be limiting. In an embodiment, the high 1730 and low 1740 boundaries of the projection constitute an applied standard deviation, based on success data from all other supported jobs. In considering the candidate flow for the job, the platform evaluates, based on results for all the other supported jobs, what a reasonable deviation is from what may be described as "a success path".

In an embodiment, it is the amount of deviation from the success path that drives suggestions for upgrades. If, for example, on a particular date the success rate exceeded the upper boundary 1730, it might mean that the scoring needs to be adjusted because too many people are negotiating the initial screen successfully. Alternatively, if the candidate flow is too low, more aggressive marketing of the job may be suggested.

As a hiring manager, the user regularly checks the portal message center, for example, first thing in the morning. In an embodiment, the portal has several primary screens, for example: the listing of the user's jobs 1408 (FIG. 15), the people who have applied for that job 1406 and the detail 1406 (FIG. 16) for each applicant.

As shown, the Message Center 1404 says "Adding Dice would increase your candidate flow by 87 over the next 30 days." Based on the flow of applicants, interviews and hires, the platform statistically evaluates the effectiveness of the hiring effort, making recommendations as appropriate along the way.

The user may make decisions on each candidate, such as to interview the applicant, to not interview them, or to pass on them, as shown in the tabs 1412. All of the workflow, follow-up and tracking happens as a by-product of the expression of the user's decision.

The platform thus provides a solution for creating a listing for a job where the user goes to a particular portal like Google, building a job search for a particular type of person against a database of previously filled jobs. The platform builds upon the fact that there is an inventory of successful placements and successful listings, and takes advantage of that data to build the listing and to place the job. Additionally, a smart database search engine incorporates fuzzy logic technology to identify jobs that may actually be the same, even though they are described differently.

Additionally, the platform actually monitors the flow of applicants for the job and suggests alternatives and course corrections along the way which can be performed by the user or the user can upgrade to obtain the assistance of a hiring consultant.

Within the present context, the daily flow of interested people (applicants) is known as the job flow. It will be appreciated that the job flow can effectively serve as a measure of how stale the job listing has become, or how successful it is in the way of attracting people. For example, if the job has been live for 15 or 16 days and the applicant flow has dried up, it may be necessary to freshen the job. In such a case, the platform may suggest to the user, for example, "Your flow is down below where it needs to be. You need to increase the marketing again." The user is then offered the opportunity to revise the marketing choices or to upgrade.

As mentioned above, one of the criteria for assessing the success of a job listing is the hiring manager's satisfaction with the new hire. In an embodiment, the length of time the new hire stays in the job may be used as an index of hiring manager satisfaction. In an embodiment, completion of a probationary period may be used as an index of hiring manager satisfaction. In an embodiment, a platform-generated email follow up survey may be mailed to both the hiring manager and the candidate, for example, 90 days after start, at 6 months, at 1 year, and so on, thus providing data regarding who was deemed the most valuable hire to supplement data regarding who was hired most quickly.

FIG. 16 provides a screenshot of a candidate detail page 1406 from a heuristically-driven platform and method for hiring based on previously-supported successful jobs. Accordingly, the candidate detail page 1406 displays to the user the information provided by a candidate by means of the page 600. The page 1406 conveys to the user the information provided by a candidate at the time of application. In an embodiment, the page 1406 may contain a header 1602 that lists various factual and biographical details about the candidate, for example: full name, information about current employment such as job title and location, contact information such as phone number and email addresses, Job ID, Job Title, and the source of the Application. It is to be understood that the information supplied in the header may vary according to the source of the application and the information provided by the candidate. Additionally, the information supplied may vary according to employer preferences, or the level of responsibility, i.e., more information may be provided for an executive position than for a middle-management job.

In an embodiment, the page 1406 may include a UI element 1610 such as a toolbar that allows a reviewer to specify the status of an application or to take a specific action in regard to an application, for example:
Make Decision;
Hold;
Transfer;
Forward Profile;
Note;
Email; and
Print.

In an embodiment, selection of at least some of the foregoing actions grants access to a UI element such as a pull-down menu listing the various options for an action.

Thus, the options for Make Decision' could be 'interview', 'hire', 'reject' and so on, as described herein above.

In an embodiment, the candidate detail page 1406 may constitute several different pages, each accessed by means of a series 1612 of tabs, for example:
Online Interview;
Resume and Contact Information;
Notes and Attachments; and
History.

In an illustrative embodiment, an online interview page may constitute several different sections. There may be a two-stage interview process that includes, for example, a section 1606 for initial interview questions and a section 1604 for secondary interview questions. For example, as shown in FIG. 5, there may be short answer questions such as multiple-choice and there may be essay questions. As in FIG. 5, there are may be interview questions requiring short factual answers such as work experience and willingness to relocate and there may be open-ended questions requiring longer answers that allow the user to assess the candidates personal qualities, for example, the candidate's ability to make decisions.

In an embodiment, the page 1406 reports a score computed by the platform based on the candidate's answers to interview questions. Everyone who applies proceeds through the two-stage online interview.

FIGS. 5 and 6 showed pages whereby a user entered information regarding a job into an online form in order to create a job listing. In most cases, it is anticipated that the user will select a previously-successful job listing from a set of job listing retrieved in response to a query entered by the user based, for example, on a job title, or one or more keywords that are relevant to the job title. The candidate detail page 1406 displays the applicant's answers to the questions posed during the 2-stage interview process.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A method for implementing a hiring campaign over a network on a computing system that includes a computing device having a processor associated therewith, wherein the processor includes instructions for executing the method comprising:
storing a plurality of records in a database, wherein each of the records correspond to a previous job listing that resulted in a successful placement, defining a successful previous job listing, wherein each of the records includes identification of venues associated with each of the successful previous job listings, and values for job type and metrics collected for each of the successful previous job listings;
determining a metric of effectiveness for each of the successful previous job listings;
ranking the successful previous job listings based on the determined metric of effectiveness;
receiving an input signal over the network from a user associated with the hiring campaign through a client computer, wherein the input signal includes a search term related to a new job for a locale corresponding to the hiring campaign;
using the input signal received from the user through the client computer to retrieve at least one of the successful previous job listings from the database for the locale corresponding to the hiring campaign, using fuzzy logic, wherein the retrieved at least one successful previous job listing is based either on a matching between the search term and any of the job type or metrics, or that the search term is the same but described differently than any of the job type or metrics;
automatically sending over the network the retrieved at least one successful previous job listing for the locale corresponding to the hiring campaign to the client computer for display to the user, wherein each of the successful previous job listings includes a corresponding title and description;
receiving a selection from the user over the network through the client computer of a selected displayed successful previous job listing for the locale corresponding to the hiring campaign;
automatically creating a hiring campaign for the new job, wherein the hiring campaign includes a new job listing that includes at least a portion of the user-selected successful previous job listing;
modifying the new job listing based on listing input received from the user over the network through the client computer;
sending to the client computer over the network for presentation to the user information associated with one or more of the venues corresponding to the retrieved at least one successful previous job listing, wherein the information includes at least one of the determined metrics of effectiveness for the venues;
receiving from the user over the network through the client computer a user-selected venue of the venues;
sending the modified new job listing over the network to the user-selected venue for publication;
automatically monitoring candidate responses to the published new job listing;
based on the monitoring:
upon a determination that performance of the hiring campaign fails to meet at least one of the determined metrics for effectiveness,
automatically suggesting modification of the hiring campaign over the network to improve the performance of the hiring campaign; and
modifying the hiring campaign based on listing modification input received from the user over the network through the client computer; and
upon a determination that the hiring campaign results in a successful job placement for the new job listing for the locale corresponding to the hiring campaign, updating the database with a new record that includes identification of the user-selected venues, and values for the job type and metrics associated with the new job listing;
wherein the method automatically incorporates new data from the new record in the form of successful job listing and associated data, to improve subsequent performance for the user.

2. The method of claim 1, wherein the input signal received over the network from the user through the client computer includes any of:
at least one key word related to the new job; and
at least one job title for the new job.

3. The method of claim 1, wherein the determined metrics of effectiveness include any of:

applicant flow per unit of time;
applicant ratio of pass/fail of initial interview;
applicant presentation time;
applicant time to accept position;
applicant time to hire; and
survey data.

4. The method of claim 1, wherein the metrics collected for each of the previous job listings include any of job titles, job descriptions and interview questions;
wherein the displaying the retrieved at least one previous job listing includes displaying the retrieved at least one previous job listing in order of effectiveness; and
wherein at least one user-selected filter is applied to the retrieved at least one previous job listing.

5. The method of claim 1, wherein the listing input includes any of:
modification of at least one question at any stage of a multi-stage interview; and
configuration of at least one rating scale associated with at least one question in any stage of a multi-stage interview.

6. The method of claim 1, wherein the listing input received from the user includes any of:
job name;
job title;
job location;
EEO (Equal Employment Opportunity) category;
creative job title;
industry;
job category;
department;
job level;
visa information;
travel percentage;
salary information;
position type;
candidate message;
position description; and
employer description.

7. The method of claim 1, wherein the information sent over the network to the client computer for presentation to the user includes any of:
at least one previously-successful venue;
the user-selected venue;
information about a number of applicants and a number of hires for a relevant technology category; and
an indication of which venues are particularly recommended for the job.

8. The method of claim 1, wherein the information sent over the network to the client computer for presentation to the user includes fee information associated with the venues.

9. The method of claim 1, further comprising any of:
sending a completed job listing over the network to the client computer for review by the user; and
responsive to receipt of a user specification over the network, configuring user settings.

10. The method of claim 1, wherein suggesting modification of the hiring campaign over the network includes any of:
suggesting modification of the user-selected venue; and
suggesting an upgrade to a support level that includes assistance from a hiring specialist.

11. The method of claim 10, further comprising:
referring the user over the network to at least one hiring specialist having demonstrated expertise at filling jobs similar to the new job, the expertise demonstrated according to any of:
number of similar jobs in a predetermined locality filled by the hiring specialist;
average amount of time taken by the hiring specialist to fill the similar jobs in the predetermined locality;
number of ratings given by hiring managers; and
distribution of ratings given by hiring managers.

12. The method of claim 1, further comprising:
offering a plurality of successive support levels over the network that include a basic support level and at least one support level offering all services provided by a preceding support level and at least one additional service; and
responsive to receipt of a user selection over the network, configuring one of the support levels.

13. The method of claim 1, further comprising:
receiving over the network a purchase request from the user; and
executing the received purchase request.

14. The method of claim 1, further comprising any of:
presenting to the user over the network a list of candidates replying to the published new job listing;
reporting to the user over the network a current status of a candidate's application;
reporting to the user over the network a venue from which each candidate originated;
computing and sending to the client computer over the network for presentation to the user a score for each candidate, the score based on candidate responses to questions in a multi-stage interview, the score computed based on at least one rating scale associated to at least one question in any stage of the multi-stage interview; and
sending to the client computer over the network for presentation to the user at least one candidate detail page for any one candidate from the list of candidates replying to the published new job listing.

15. The method of claim 1, further comprising:
computing candidate flow per unit of time;
comparing the computed candidate flow to the determined metric for effectiveness;
responsive to determination that the candidate flow fails to meet the determined metrics of effectiveness, suggesting the modification.

16. The method of claim 15, further comprising:
determining an ideal candidate flow;
determining a standard deviation from the candidate flow;
responsive to a determination that the candidate flow is less than the ideal candidate flow by at least one standard deviation, recommending to the user over the network an increase of marketing activity; and
responsive to a determination that the candidate flow is greater than the ideal candidate flow by at least one standard deviation, recommending revision of a scoring algorithm for interview questions.

17. The method of claim 1, further comprising:
receiving from the user over the network an indication of action taken on a candidate's application.

18. A system for implementing a hiring campaign comprising:
a server including a processor; and
a mechanism for sending and receiving information between the server and a client computer over a network;
wherein the processor is programmed to perform operations comprising:
storing a plurality of records in a database, wherein each of the records correspond to a previous job listing that resulted in a successful placement, defining a successful previous job listing, wherein each of the records includes identification of venues associated with each of the successful previous job listings, and values for job type and metrics collected for each of the successful previous job listings;

determining a metric of effectiveness for each of the successful previous job listings;

ranking the successful previous job listings based on the determined metric of effectiveness;

receiving an input signal over the network from a user associated with the hiring campaign through the client computer, wherein the input signal includes a search term related to a new job for a locale corresponding to the hiring campaign;

using the input signal received over the network from the user through the client computer to retrieve at least one of the successful previous job listings from the database for the locale corresponding to the hiring campaign, using fuzzy logic, wherein the retrieved at least one successful previous job listing is based either on a matching between the search term and any of the job type or metrics, or that the search term is the same but described differently than any of the job type or metrics;

automatically sending over the network the retrieved at least one successful previous job listing for the locale corresponding to the hiring campaign to the client computer for display to the user;

receiving a selection from the user over the network through the client computer of a selected displayed successful previous job listing;

automatically creating a hiring campaign for the new job, wherein the hiring campaign includes a new job listing that includes at least a portion of the user-selected previous job listing;

modifying the new job listing based on listing input received from the user over the network through the client computer;

sending to the client computer over the network for presentation to the user information associated with one or more of the venues corresponding to the retrieved at least one previous job listing, wherein the information includes at least one determined metric of effectiveness for the venues;

receiving from the client computer over the network a user-selected venue of the venues;

sending the modified new job listing over the network to the user-selected venue for publication;

monitoring candidate responses to the published new job listing; and based on the monitoring:
  upon a determination that performance of the hiring campaign fails to meet at least one of the determined metrics for effectiveness,
    automatically suggesting to the user over the network modification of the hiring campaign to improve the performance of the hiring campaign; and
    modifying the hiring campaign based on listing modification input received from the user over the network through the client computer; and
  upon a determination that the hiring campaign results in a successful job placement for the new job listing for the locale corresponding to the hiring campaign, updating the database with a new record that includes identification of the user-selected venues, and values for the job type and metrics associated with the new job listing;

wherein the method automatically incorporates new data from the new record in the form of successful job listing and associated data, to improve subsequent performance for the user.

19. A non-transitory computer-readable medium having embodied thereon computer-readable instructions which, when executed by a computer, implements a method for implementing a hiring campaign over a network, the method comprising:

storing a plurality of records in a database, wherein each of the records correspond to a previous job listing that resulted in a successful placement, defining a successful previous job listing, wherein each of the records includes identification of venues associated with each of the successful previous job listings, and values for job type and metrics collected for each of the successful previous job listings;

determining a metric of effectiveness for evaluating job listings;

ranking the successful previous job listings based on the determined metric of effectiveness;

receiving an input signal over the network from a user through a client computer, the input comprising a search term related to a new job for a locale corresponding to the hiring campaign;

using the input signal received from the user through the client computer to retrieve at least one of the successful previous job listings from the database for the locale corresponding to the hiring campaign, using fuzzy logic, wherein the retrieved at least one previous job listing is based either on a matching between the search term and the at least one previous job listing, or that the search term is the same but described differently than the at least one previous job listing;

sending over the network the retrieved at least one previous job listing for the locale corresponding to the hiring campaign to the client computer for display to the user;

receiving a selection over the network from the user through the client computer of a selected displayed previous job listing;

creating a hiring campaign for the new job, wherein the hiring campaign includes a new job listing that includes at least a portion of the user-selected previous job listing;

modifying the new job listing based on listing input received from the user through the client computer;

sending over the network to the client computer for presentation to the user information associated with one or more of the venues corresponding to the retrieved at least one previous job listing, wherein the information includes at least one of the determined metrics of effectiveness for the venues;

receiving over the network from the client computer a user-selected venue of the venues;

sending over the network the modified new job listing to the user-selected venue for publication;

monitoring candidate responses to the published new job listing; and based on the monitoring, performing any of
  upon a determination that performance of the hiring campaign fails to meet at least one of the determined metrics of effectiveness, automatically suggesting to the user over the network modification of the hiring campaign to improve the performance of the hiring campaign; and modifying the hiring campaign based on listing modification input received from the user over the network through the client computer; and upon a determination that performance of the hiring campaign results in a successful job placement for the new job listing for the locale corresponding to the hiring campaign, updating the database with a new record that includes identification of the user-selected venues, and values for the job type and metrics associated with the new job listing;

wherein the method automatically incorporates new data from the new record in the form of successful job listing and associated data, to improve subsequent performance for the user.

20. A method for implementing a hiring campaign over a network on a computing system that includes a computing device having a processor associated therewith, wherein the processor is configured to execute the method comprising:

collecting data regarding success of a particular marketing channel for attracting candidates qualified for a particular job type;

collecting data regarding at least one of:
success of a particular job title for attracting candidates qualified for the particular job type;
success of a particular job description for attracting candidates qualified for the particular job type; and
success of particular interview questions for attracting candidates qualified for the particular job type;

placing the collected data in a searchable data store;

receiving an input signal over the network from a user associated with the hiring campaign through a client computer, wherein the input includes at least one search term related to a new job for a locale corresponding to the hiring campaign;

using the input signal received from the user through the client computer to automatically retrieve at least one successful previous job listing that resulted in a successful placement from the searchable data store for the locale corresponding to the hiring campaign, using fuzzy logic, wherein the retrieved at least one successful previous job listing is based either on a matching between the search term and the particular job type associated with the at least one successful previous job listing, or that the search term is the same but described differently than the particular job type associated with the at least one successful previous job listing;

automatically sending over the network the retrieved at least one successful previous job listing for the locale corresponding to the hiring campaign to the client computer for display to the user;

receiving a selection over the network from the user through the client computer of a selected displayed successful previous job listing;

automatically creating a hiring campaign for the new job, wherein the hiring campaign includes a new job listing that includes at least a portion of the user-selected successful previous job listing for the locale corresponding to the hiring campaign;

automatically modifying the new job listing based on listing input received over the network from the user through the client computer;

receiving from the user over the network through the client computer a user-selected marketing channel for posting the modified new job listing;

automatically broadcasting over the network the modified new job listing through the user-selected marketing channel;

automatically monitoring over the network candidate responses to the published new job listing; and based on the monitoring:
upon a determination that the published new job listing fails to meet a benchmark of success,
automatically suggesting modification to the user over the network of the hiring campaign to improve the performance of the hiring campaign; and modifying the hiring campaign based on listing modification input received over the network from the user through the client computer; and upon a determination that the published new job listing results in a successful job placement for the new job listing for the locale corresponding to the hiring campaign, updating the database with a new record that includes data corresponding to the new job listing;

wherein the method automatically incorporates new data from the new record in the form of successful job listing and associated data, to improve subsequent performance for the user.

21. A non-transitory computer-readable medium having embodied thereon computer-readable instructions which, when executed by a computer, implements a method for implementing a hiring campaign over a network, the method comprising:

collecting data regarding success of a particular marketing channel for attracting candidates qualified for a particular job type;

collecting data regarding at least one of:
success of a particular job title for attracting candidates qualified for the particular job type;
success of a particular job description for attracting candidates qualified for the particular job type; and
success of particular interview questions for attracting candidates qualified for the particular job type;

placing the collected data in a searchable data store;

receiving an input signal over the network from a user associated with the hiring campaign through a client computer, wherein the input signal includes at least one search term related to a new job for a locale corresponding to the hiring campaign;

using the input signal received over the network from the user through the client computer to automatically retrieve at least one successful previous job listing from the searchable data store for the locale corresponding to the hiring campaign, using fuzzy logic, wherein the retrieved at least one successful previous job listing is based either on a matching between the search term and the particular job type associated with the at least one successful previous job listing, or that the search term is the same but described differently than the particular job type associated with the at least one successful previous job listing;

automatically sending over the network the retrieved at least one successful previous job listing for the locale corresponding to the hiring campaign to the client computer for display to the user;

receiving a selection over the network from the user through the client computer of a selected displayed successful previous job listing for the locale corresponding to the hiring campaign;

automatically creating a hiring campaign for the new job, wherein the hiring campaign includes a new job listing that includes at least a portion of the user-selected successful previous job listing;

automatically modifying the new job listing based on listing input received from the user through the client computer;

receiving from the user over the network through the client computer a user-selected marketing channel for posting the modified new job listing;

automatically broadcasting over the network the modified new job listing through the user-selected marketing channel;

automatically monitoring candidate responses to the published new job listing; and based on the monitoring:
   upon a determination that the published new job listing fails to meet a benchmark of success,
      automatically suggesting to the user over the network modification of the hiring campaign to improve the performance of the hiring campaign; and
      modifying the hiring campaign based on listing modification input received over the network from the user through the client computer; and
   upon a determination that the published new job listing results in a successful job placement for the new job listing for the locale corresponding to the hiring campaign, updating the database with a new record that includes data corresponding to the new job listing;
   wherein the method automatically incorporates new data from the new record in the form of successful job listing and associated data, to improve subsequent performance for the user.

22. A system for implementing a hiring campaign comprising:

a server including a processor; and a mechanism for sending and receiving information between the server and a client computer over a network;

wherein the processor is programmed to perform operations comprising:
   automatically collecting data regarding success of a particular marketing channel for attracting candidates qualified for a particular job type;
   automatically collecting data regarding at least one of:
      success of a particular job title for attracting candidates qualified for the particular job type;
      success of a particular job description for attracting candidates qualified for the particular job type; and
      success of particular interview questions for attracting candidates qualified for the particular job type;
   automatically placing the collected data in a searchable data store;
   receiving over the network an input signal from a user associated with the hiring campaign through the client computer, wherein the input signal includes at least one search term related to a new job for a locale corresponding to the hiring campaign;
   using the input signal received over the network from the user through the client computer to automatically retrieve at least one successful previous job listing from the searchable data store for the locale corresponding to the hiring campaign, using fuzzy logic, wherein the automatically retrieved at least one successful previous job listing is based either on a matching between the search term and the particular job type associated with the at least one successful previous job listing, or that the search term is the same but described differently than the particular job type associated with the at least one successful previous job listing;
   automatically sending over the network the retrieved at least one successful previous job listing for the locale corresponding to the hiring campaign to the client computer for display to the user;
   receiving a selection over the network from the user through the client computer of a selected displayed successful previous job listing for the locale corresponding to the hiring campaign;
   automatically creating a hiring campaign for the new job, wherein the hiring campaign includes a new job listing that includes at least a portion of the user-selected previous job listing;
   automatically modifying the new job listing based on listing input received from the user through the client computer;
   receiving from the user over the network through the client computer a user-selected marketing channel for posting the modified new job listing;
   automatically broadcasting over the network the modified new job listing through the user-selected marketing channel;
   automatically monitoring candidate responses to the published new job listing; and
   based on the monitoring:
      upon a determination that the published new job listing fails to meet a benchmark of success,
         automatically suggesting to the user over the network modification of the hiring campaign to improve the performance of the hiring campaign; and
         modifying the hiring campaign based on listing modification input received over the network from the user through the client computer; and
      upon a determination that the published new job listing results in a successful job placement for the new job listing for the locale corresponding to the hiring campaign, updating the database with a new record that includes data corresponding to the new job listing;
   wherein the processor automatically incorporates new data from the new record in the form of successful job listing and associated data, to improve subsequent performance for the user.

* * * * *